(12) United States Patent
McKenna et al.

(10) Patent No.: US 7,751,815 B2
(45) Date of Patent: Jul. 6, 2010

(54) SYSTEM FOR INTEGRATING AN AIRBORNE WIRELESS CELLULAR NETWORK WITH TERRESTRIAL WIRELESS CELLULAR NETWORKS AND THE PUBLIC SWITCHED TELEPHONE NETWORK

(75) Inventors: Daniel Bernard McKenna, Steamboat Springs, CO (US); Joseph M. Cruz, Naperville, IL (US); Kenneth Joseph Jochim, Boulder, CO (US); Anand K. Varadachari, Bartlett, IL (US); Harold Grant Saroka, Ashburn, VA (US); Dandan Liu, Montreal (CA)

(73) Assignee: Aircell LLC, Itasca, IL (US)

( * ) Notice: Subject to any disclaimer, the term of this patent is extended or adjusted under 35 U.S.C. 154(b) by 289 days.

(21) Appl. No.: 11/492,545

(22) Filed: Jul. 24, 2006

(65) Prior Publication Data

US 2007/0021117 A1 Jan. 25, 2007

Related U.S. Application Data

(63) Continuation of application No. 10/730,329, filed on Dec. 7, 2003, now Pat. No. 7,113,780, which is a continuation-in-part of application No. 09/686,923, filed on Oct. 11, 2000, now Pat. No. 6,788,935, which is a continuation-in-part of application No. 09/379,825, filed on Aug. 24, 1999, now Pat. No. 6,408,180, which is a continuation-in-part of application No. 08/960,183, filed on Oct. 29, 1997, now Pat. No. 6,108,539, which is a continuation-in-part of application No. 08/709,417, filed on Sep. 6, 1996, now Pat. No. 5,878,346, which is a continuation-in-part of application No. 07/847,920, filed on Mar. 6, 1992, now Pat. No. 5,557,656, and a continuation-in-part of application No. 08/027,333, filed on Mar. 8, 1993, now Pat. No. 5,444,762.

(51) Int. Cl.
*H04W 4/00* (2009.01)
*H04W 24/00* (2009.01)
*H04J 3/16* (2006.01)

(52) U.S. Cl. .................. 455/431; 455/456.3; 455/430; 370/469

(58) Field of Classification Search ............... 455/431, 455/428, 11.1; 340/521, 539.26; 709/246, 709/206; 370/469, 316
See application file for complete search history.

(56) References Cited

U.S. PATENT DOCUMENTS

| | | |
|---|---|---|
| 3,659,085 A | 4/1972 | Potter et al. |
| 4,115,777 A | 9/1978 | Taylor |
| 4,654,867 A | 3/1987 | Labedz et al. |
| 5,123,112 A * | 6/1992 | Choate .................. 455/524 |
| 5,212,804 A * | 5/1993 | Choate .................. 455/431 |
| 5,408,515 A | 4/1995 | Bhagat et al. |
| 5,519,761 A * | 5/1996 | Gilhousen ............... 455/431 |
| 5,543,779 A * | 8/1996 | Aspesi et al. .......... 340/539.26 |
| 5,805,683 A | 9/1998 | Berberich, Jr. |
| 5,826,188 A * | 10/1998 | Tayloe et al. ............ 455/428 |
| 5,832,380 A | 11/1998 | Ray et al. |
| 5,848,359 A | 12/1998 | Furtaw |
| 5,887,258 A | 3/1999 | Lemozit et al. |
| 5,950,129 A | 9/1999 | Schmid et al. |
| 5,995,833 A | 11/1999 | Zicker |
| 6,002,944 A | 12/1999 | Beyda |
| 6,040,781 A | 3/2000 | Murray |
| 6,055,425 A * | 4/2000 | Sinivaara ............... 455/431 |
| 6,104,926 A * | 8/2000 | Hogg et al. ............. 455/431 |
| 6,195,529 B1 | 2/2001 | Linz et al. |
| 6,263,206 B1 | 7/2001 | Potochniak et al. |
| 6,304,762 B1 | 10/2001 | Myers et al. |
| 6,314,286 B1 * | 11/2001 | Zicker ................... 455/431 |
| 6,324,398 B1 | 11/2001 | Lanzerotti et al. |
| 6,353,734 B1 | 3/2002 | Wright et al. |
| 6,392,692 B1 | 5/2002 | Monroe |
| 6,393,281 B1 | 5/2002 | Capone et al. |
| 6,418,327 B1 | 7/2002 | Carey et al. |
| 6,430,412 B1 | 8/2002 | Hogg et al. |
| 6,519,266 B1 * | 2/2003 | Manning et al. .......... 370/469 |
| 6,545,601 B1 * | 4/2003 | Monroe ................. 340/521 |
| 6,577,419 B1 | 6/2003 | Hall et al. |
| 6,580,915 B1 | 6/2003 | Kroll |
| 6,615,052 B1 | 9/2003 | Parmenter |

| | | | |
|---|---|---|---|
| 6,735,438 B1 | 5/2004 | Sabatino | |
| 6,741,841 B1 | 5/2004 | Mitchell | |
| 6,754,489 B1 | 6/2004 | Roux et al. | |
| 6,757,712 B1* | 6/2004 | Bastian et al. | 709/206 |
| 6,760,778 B1* | 7/2004 | Nelson et al. | 709/246 |
| 6,788,935 B1 | 9/2004 | McKenna et al. | |
| 6,799,037 B1* | 9/2004 | Mielke et al. | 455/435.1 |
| 6,880,750 B2 | 4/2005 | Pentel | |
| 6,889,042 B2 | 5/2005 | Rousseau et al. | |
| 7,050,755 B2 | 5/2006 | Kline | |
| 7,062,268 B2 | 6/2006 | McKenna | |
| 7,107,062 B2 | 9/2006 | Cruz et al. | |
| 7,280,535 B1 | 10/2007 | Bergman et al. | |
| 2002/0010633 A1 | 1/2002 | Brotherston | |
| 2002/0045444 A1 | 4/2002 | Usher et al. | |
| 2002/0059614 A1 | 5/2002 | Lipsanen et al. | |
| 2002/0090931 A1 | 7/2002 | Papineau et al. | |
| 2002/0123344 A1 | 9/2002 | Criqui et al. | |
| 2003/0032426 A1 | 2/2003 | Gilbert et al. | |
| 2003/0055975 A1 | 3/2003 | Nelson et al. | |
| 2003/0084108 A1 | 5/2003 | Syed | |
| 2003/0093187 A1 | 5/2003 | Walker | |
| 2004/0063433 A1 | 4/2004 | Garrison | |
| 2004/0137840 A1 | 7/2004 | La Chapelle et al. | |
| 2004/0142658 A1 | 7/2004 | McKenna et al. | |
| 2005/0216938 A1 | 9/2005 | Brady et al. | |
| 2005/0221875 A1 | 10/2005 | Grossman et al. | |
| 2006/0009262 A1 | 1/2006 | Hamm | |
| 2006/0048196 A1 | 3/2006 | Yau | |
| 2006/0064746 A1 | 3/2006 | Aaron et al. | |
| 2007/0021117 A1 | 1/2007 | McKenna et al. | |
| 2007/0042772 A1 | 2/2007 | Salkini et al. | |
| 2007/0087756 A1 | 4/2007 | Hoffberg | |
| 2007/0105600 A1 | 5/2007 | Mohanty et al. | |
| 2007/0274294 A1 | 11/2007 | Sasaki et al. | |
| 2007/0281682 A1 | 12/2007 | Raju et al. | |
| 2008/0070601 A1 | 3/2008 | Brueckheimer et al. | |
| 2008/0090546 A1 | 4/2008 | Dickinson et al. | |
| 2009/0016339 A1 | 1/2009 | Tanizawa et al. | |

FOREIGN PATENT DOCUMENTS

| | | |
|---|---|---|
| WO | WO-0146822 A1 | 6/2001 |
| WO | WO-20060128946 A1 | 12/2006 |
| WO | WO-2008048742 A1 | 4/2008 |

OTHER PUBLICATIONS

Li et al.; "Airborne Operation of Portable Electronic Devices"; IEEE Antenna's and Propagation Magazine; vol. 44, No. 4; Aug. 2002; pp. 30-39.
Papavramidis et al.; "Adaptation Of Land Mobile Systems For Onboard Operation"; IEEE Conference; 1993; pp. 258-263.
Uhlirz; "Concept of a GSM-based Communication System for High-Speed Trains"; 1994 IEEE 44th Vehicular Technology Conference; Stockholm; Jun. 8-10, 1994; pp. 1130-1134.
In the US Patent and Trademark Office in re: U.S. Appl. No. 07/847,920, Non-Final Office Action dated Jul. 30, 1993, number of pages unknown; and corresponding response dated Oct. 26, 1993, number of pages unknown.
In the US Patent and Trademark Office in re: U.S. Appl. No. 07/847,920, Non-Final Office Action dated Jan. 27, 1994, number of pages unknown; and corresponding response dated May 31, 1994, number of pages unknown; and supplemental response dated Sep. 20, 1994, number of pages unknown.
In the US Patent and Trademark Office in re: U.S. Appl. No. 07/847,920, Non-Final Office Action dated Feb. 27, 1995, number of pages unknown; and corresponding response dated May 24, 1995, number of pages unknown.
In the US Patent and Trademark Office in re: U.S. Appl. No. 07/847,920, Final Office Action dated Aug. 22, 1995, number of pages unknown.
In the US Patent and Trademark Office in re: U.S. Appl. No. 07/847,920, Final Office Action dated Mar. 21, 1996, number of pages unknown; and corresponding response dated Mar. 27, 1996, number of pages unknown.
In the US Patent and Trademark Office in re: U.S. Appl. No. 08/027,333, Non-Final Office Action dated Jun. 24, 1994, number of pages unknown; and corresponding response dated Dec. 22, 1994, number of pages unknown.
In the US Patent and Trademark Office in re: U.S. Appl. No. 08/709,417, Non-Final Office Action dated Feb. 18, 1998, number of pages unknown; and corresponding response dated Apr. 20, 1998, number of pages unknown.
In the US Patent and Trademark Office in re: U.S. Appl. No. 08/709,417, Final Office Action dated Jun. 11, 1998, number of pages unknown; and corresponding response dated Aug. 3, 1998, number of pages unknown.
In the US Patent and Trademark Office in re: U.S. Appl. No. 08/960,183, Non-Final Office Action dated Nov. 5, 1999, number of pages unknown; and corresponding response dated Dec. 6, 1999, number of pages unknown.
In the US Patent and Trademark Office in re: U.S. Appl. No. 09/379,825, Non-Final Office Action dated May 11, 2001, number of pages unknown; and corresponding response dated May 29, 2001, number of pages unknown.
In the US Patent and Trademark Office in re: U.S. Appl. No. 11/492,545, Non-Final Office Action dated Aug. 7, 2008, 19 pages; and corresponding response dated Oct. 10, 2008, 29 pages.
In the US Patent and Trademark Office in re: U.S. Appl. No. 11/492,545, Final Office Action dated Dec. 19, 2008, 18 pages; and corresponding response dated Jan. 27, 2009, 34 pages; and supplemental response dated Apr. 17, 2009, 35 pages.
In the US Patent and Trademark Office in re: U.S. Appl. No. 11/492,545, Non-Final Office Action dated Jun. 10, 2009, 20 pages.
In the US Patent and Trademark Office in re: U.S. Appl. No. 11/590,146, Non-Final Office Action dated Sep. 24, 2008, 9 pages; and corresponding response dated Jan. 29, 2009, 13 pages.
In the US Patent and Trademark Office in re: U.S. Appl. No. 11/590,146, Final Office Action dated Mar. 31, 2009, 9 pages; and corresponding response dated May 29, 2009, 16 pages.
In the US Patent and Trademark Office in re: U.S. Appl. No. 12/021,133, Non-Final Office Action dated Jun. 18, 2009, 14 pages.

* cited by examiner

*Primary Examiner* — Charles N Appiah
*Assistant Examiner* — Kiet Doan
(74) *Attorney, Agent, or Firm* — Patton Boggs LLP

(57) ABSTRACT

The present non-terrestrial feature transparency system spoofs the Air-to-Ground Network and the ground-based cellular communication network into thinking that the wireless subscriber devices have no special considerations associated with their operation, even though the wireless subscriber devices are located on an aircraft in flight. This architecture requires that the non-terrestrial feature transparency system on board the aircraft replicate the full functionality of a given wireless subscriber device, that has a certain predetermined feature set from a ground-based wireless service provider, at another wireless subscriber device located within the aircraft. This mirroring of wireless subscriber device attributes enables a localized cell for in-cabin communication yet retains the same wireless subscriber device attributes for the air-to-ground link. The Air-to-Ground Network transmits both the subscriber data (comprising voice and/or other data) as well as feature set data between the Aircraft in-Cabin Network and the ground-based cellular communication network to thereby enable the wireless subscriber devices that are located in the aircraft to receive consistent wireless communication services in both the terrestrial (ground-based) and non-terrestrial regions.

44 Claims, 12 Drawing Sheets

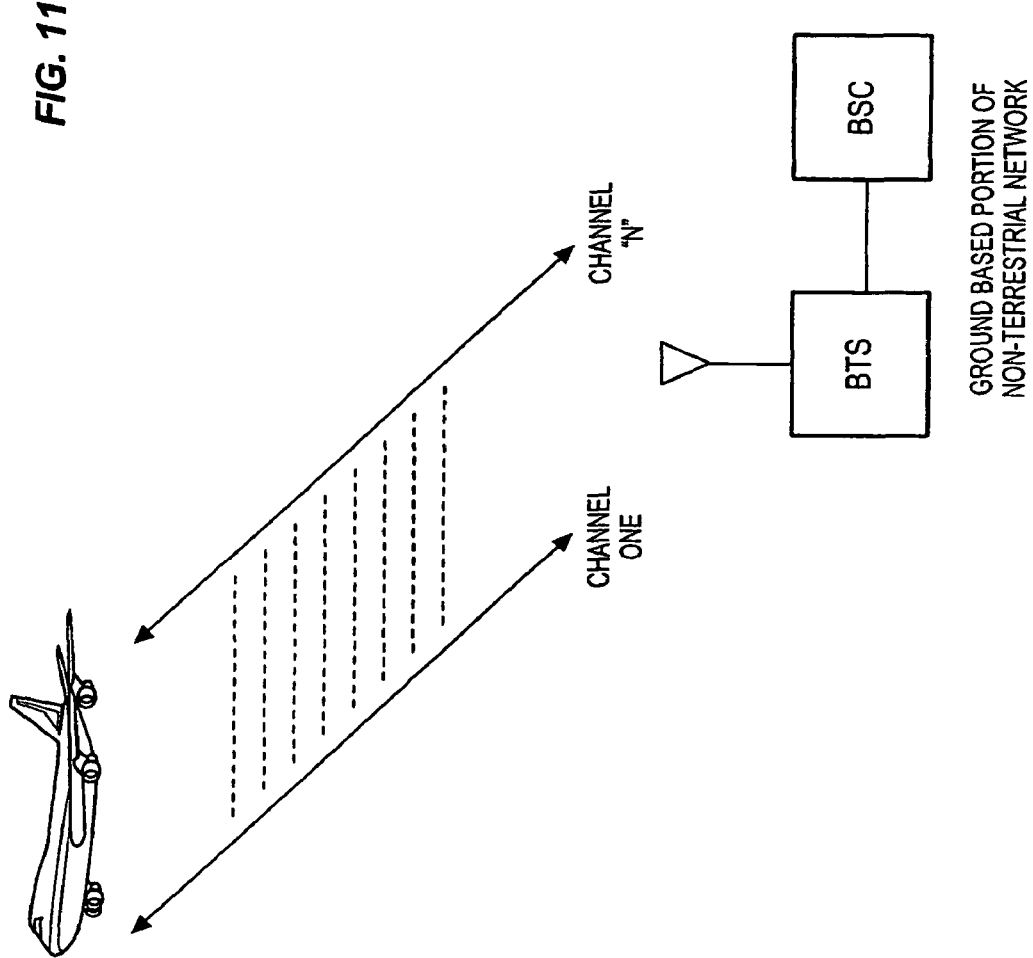

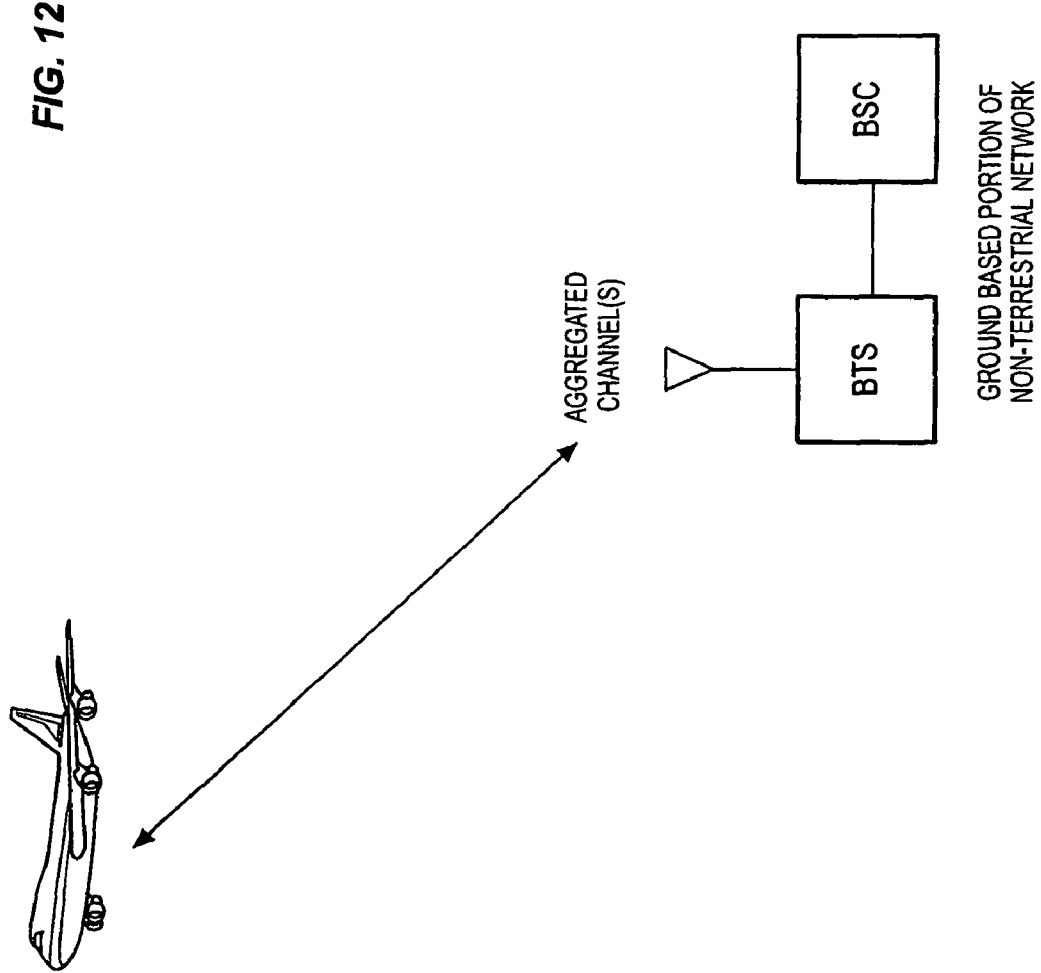

SYSTEM FOR INTEGRATING AN AIRBORNE WIRELESS CELLULAR NETWORK WITH TERRESTRIAL WIRELESS CELLULAR NETWORKS AND THE PUBLIC SWITCHED TELEPHONE NETWORK

CROSS REFERENCE TO RELATED APPLICATIONS

This application is a continuation of U.S. patent application Ser. No. 10/730,329 filed Dec. 7, 2003, which is a continuation-in-part of U.S. patent application Ser. No. 09/686,923 filed Oct. 11, 2000, now U.S. Pat. No. 6,788,935 issued Sep. 7, 2004; which is a continuation-in-part of U.S. patent application Ser. No. 09/379,825 filed Aug. 24, 1999, now U.S. Pat. No. 6,408,180 issued Jun. 18, 2002; which is a continuation-in-part of U.S. patent application Ser. No. 08/960,183 filed Oct. 29, 1997, now U.S. Pat. No. 6,108,539 issued Aug. 22, 2000; which is a continuation-in-part of U.S. patent application Ser. No. 08/709,417 filed Sep. 6, 1996, now U.S. Pat. No. 5,878,346 issued Mar. 2, 1999; which is a continuation-in-part of U.S. patent application Ser. No. 08/027,333 filed Mar. 8, 1993 now U.S. Pat. No. 5,444,762 issued Aug. 22, 1995 and U.S. patent application Ser. No. 07/847,920 filed Mar. 6, 1992 now U.S. Pat. No. 5,557,656 issued Sep. 17, 1996.

FIELD OF THE INVENTION

This invention relates to cellular communications and, in particular, to a system that enables wireless subscriber stations to receive consistent wireless communication services in both the terrestrial (ground-based) and non-terrestrial regions, as well as in other areas not served by existing cellular communication networks.

PROBLEM

It is a problem in the field of wireless communications to manage the maintenance of the services provided to the wireless subscriber as they roam among cell sites in the cellular communication network. This ability to provide wireless mobility requires that the wireless subscriber have continual access to the Public Switched Telephone Network (PSTN), the Public Switched Data Network (PSDN), and the Internet, independent of the wireless subscriber's location. In addition, the wireless subscriber should have the ability to originate and receive calls and/or data messages in a unified manner, regardless of their location, and these calls as well as any ancillary services should be handled uniformly by whatever wireless system is presently serving the wireless subscriber. This problem is especially pertinent in cases where wireless subscribers are located in an environment that is not included in the intended service area of terrestrial wireless systems, such as in aircraft or on off-shore ships.

In the field of wireless communications, it is common for a wireless subscriber to move throughout the area served by the network of their home wireless service provider and maintain their desired subscriber feature set. Feature set availability throughout the home network is managed by the home wireless service provider's database, often termed a Home Location Register (HLR), with data connections to one or more switches (packet or circuit) and various ancillary equipment, such as voicemail and short message servers, to enable this seamless feature set management. For example, if a given subscriber has established their preferred feature set which includes 3-way calling, then this 3-way calling feature would be available to them as they transitioned through handoffs from one cell to the next within the home wireless service provider's cellular network (intra-network handoff).

If the wireless subscriber were to transition inter-network, from the coverage area of their home wireless network to a network of the same or another wireless service provider (termed "roaming wireless service provider" herein), the wireless subscriber should have the ability to originate and receive calls in a unified manner, regardless of their location. In addition, it should be possible for a given wireless subscriber's feature set to move transparently with them. However, for this feature set transportability to occur, there needs to be database file sharing wherein the home wireless service HLR transfers the subscriber's authorized feature set profile to the roaming wireless service provider's database, often called a Visitor Location Register, or VLR. The VLR then recognizes that a given roaming wireless subscriber is authorized for a certain feature set and enables the roaming wireless service provider network to transparently offer these features to the wireless subscriber. In this manner, the roaming wireless subscriber retains the same authorized feature set, or "subscriber class", as they had on their home wireless service provider network. The communications between the HLR and VLR which transfers this information also allows the HLR to "know" which VLR is currently serving the subscriber, and allows the home system to cause inbound calls and/or messages to the subscriber to be directed to the roaming wireless service provider for delivery to the subscriber.

As wireless networks become more ubiquitous with enhanced capability, an unstoppable trend towards universal communication mobility is occurring. In its ultimate vision, the wireless mobility trend means continual access to information and access to other wireless networks, the Public Switched Telephone Network (PSTN), the Public Switched Data Network (PSDN), and Internet independent of a wireless subscriber's location. Given then this mobility trend of access to data or telephony capability "anywhere, anytime", a significant hole or gap exists in the spatial wireless coverage region to truly enable this visionary mobility trend. What is desired is the integration of true mobile communication access with wireless subscriber devices independent of location, in both ground-based and non-terrestrial environments. More to the point, it is highly desired to retain the features and benefits of a given ground-based wireless communication network when a subscriber enters the non-terrestrial space. This universal, ubiquitous wireless service capability is termed "One Phone Goes Anywhere" or "OPGA".

When wireless subscribers enter the non-terrestrial space, that is they fly in an aircraft independent of the type, it is presently not feasible for a subscriber to enjoy transparent or seamless feature set portability. The ground-based wireless subscriber is presently in a communication vacuum—that is, connectivity for telephony and Internet/data access through their personal wireless subscriber device is no longer possible. More to the point, today it is not presently possible to use a personal wireless subscriber device assigned to a ground-based host wireless service provider aboard an aircraft, much less have transparent access to the authorized subscriber feature set or "subscriber class".

Additionally, ground-based cellular subscriber classes do not contemplate the support of non-terrestrial classes of subscribers and services, such as TSA (Transportation Security Administration), Federal Air Marshals, Flight Attendants, Cockpit Crew, First Class Customers, Economy Class Customers, In-Flight Medical Emergency services, and Flight Operations services. Most important, ground-based cellular subscriber classes do not contemplate the necessary network functionality for enabling directed non-terrestrial emergency signaling such as forward path 911 or E911 or reverse path 911 emergency calling capability (forward path is base to mobile and reverse path is mobile to base).

Similarly, the present art for ground-based wireless networks does not contemplate the creation of a Virtual Private Non-terrestrial Network (VPNN). Such capability is an essential element for company confidential conveyance of information concerning safety and security (TSA/Federal Air Marshall) or operational information/data for an airline.

Last, the existing wireless networks do not have the capability for transparent billing solutions when a subscriber becomes "non-terrestrial". This very simple customer centric feature is necessary to ensure timely market adoption of the non-terrestrial service.

SOLUTION

The above described problems are solved and a technical advance achieved in the field by the present system for integrating an airborne wireless cellular network with ground-based cellular networks and the Public Switched Telephone Network (termed "Non-Terrestrial Feature Transparency System" herein), which enables One Phone Goes Anywhere wireless subscriber devices, that are provisioned with ground-based wireless network and Public Switched Telephone Network features, to roam in a transparent and seamless manner to a non-terrestrial wireless network.

What is desired is an integration of non-terrestrial OPGA with ground-based wireless network and PSTN features to enable transparent and seamless "roaming" to the non-terrestrial wireless network. However, the realization of this architectural functionality is non-trivial and requires substantive innovation over the present art. Architectural solutions are required for the integration of ground-based and non-terrestrial networks when a ground-based wireless subscriber becomes non-terrestrial with the following "One Phone Goes Anywhere" capabilities:

Inbound signaling and call termination
Outbound signaling and call origination
Transparent feature set portability
Transparent access to voicemail
Transparent access to SMS (Short Message Service)
Transparent subscriber class portability
Non-terrestrial subscriber classes and services
Transparent subscriber billing support
Ground-based HLR to non-terrestrial HLR connectivity
Ground-based VLR to non-terrestrial HLR connectivity
Ground-based HLR to non-terrestrial VLR connectivity
Non-terrestrial HLR to ground-based VLR connectivity
Non-terrestrial HLR to ground-based HLR connectivity
Ground-based line ranges include non-terrestrial networks
Non-terrestrial to non-terrestrial signaling
Virtual Private Non-Terrestrial Network (VPNN)
Handoffs from ground-based wireless communication networks to non-terrestrial wireless networks
Handoffs from non-terrestrial wireless networks to ground-based wireless communication networks
Transparent internet access
Transparent e-mail access
Transparent multimedia access This is accomplished by the present Non-Terrestrial Feature Transparency System, which spoofs the Aircraft In-Cabin Network and the Ground-Based Network Elements of the "Outer Network" into thinking that the wireless subscriber devices have no special considerations associated with their operation, even though the wireless subscriber devices are located on an aircraft in flight. This architecture requires that the non-terrestrial feature transparency system located on board the aircraft provide the full functionality of a given wireless subscriber's home network, which has a certain predetermined feature set from a ground-based wireless service provider, at that wireless subscriber's device when in a non-terrestrial mode. This mirroring of wireless subscriber device attributes enables a localized cell for in-cabin communication yet retains the same wireless subscriber device attributes for the air-to-ground link.

This provision of feature set transparency is accomplished in part by the use of an "Inner Network" that connects the two segments of the "Outer Network," comprising the Aircraft In-Cabin Network and the ground-based portion of the non-terrestrial cellular communication network. The Inner Network transmits both the subscriber traffic (comprising voice and/or other data) as well as feature set data between the Aircraft in-Cabin Network and the ground-based cellular communication network to thereby enable the wireless subscriber devices that are located in the aircraft to receive consistent wireless communication services in both the terrestrial (ground-based) and non-terrestrial regions.

BRIEF DESCRIPTION OF THE DRAWINGS

FIGS. 11 and 12 illustrate, in block diagram form, the architecture of the Moving Cell and Moving Subscriber implementations of the Resident Cellular Infrastructure for the Full Feature, Single Customer Technology for the Air-to-Ground Network.

DETAILED DESCRIPTION

Figure 1:
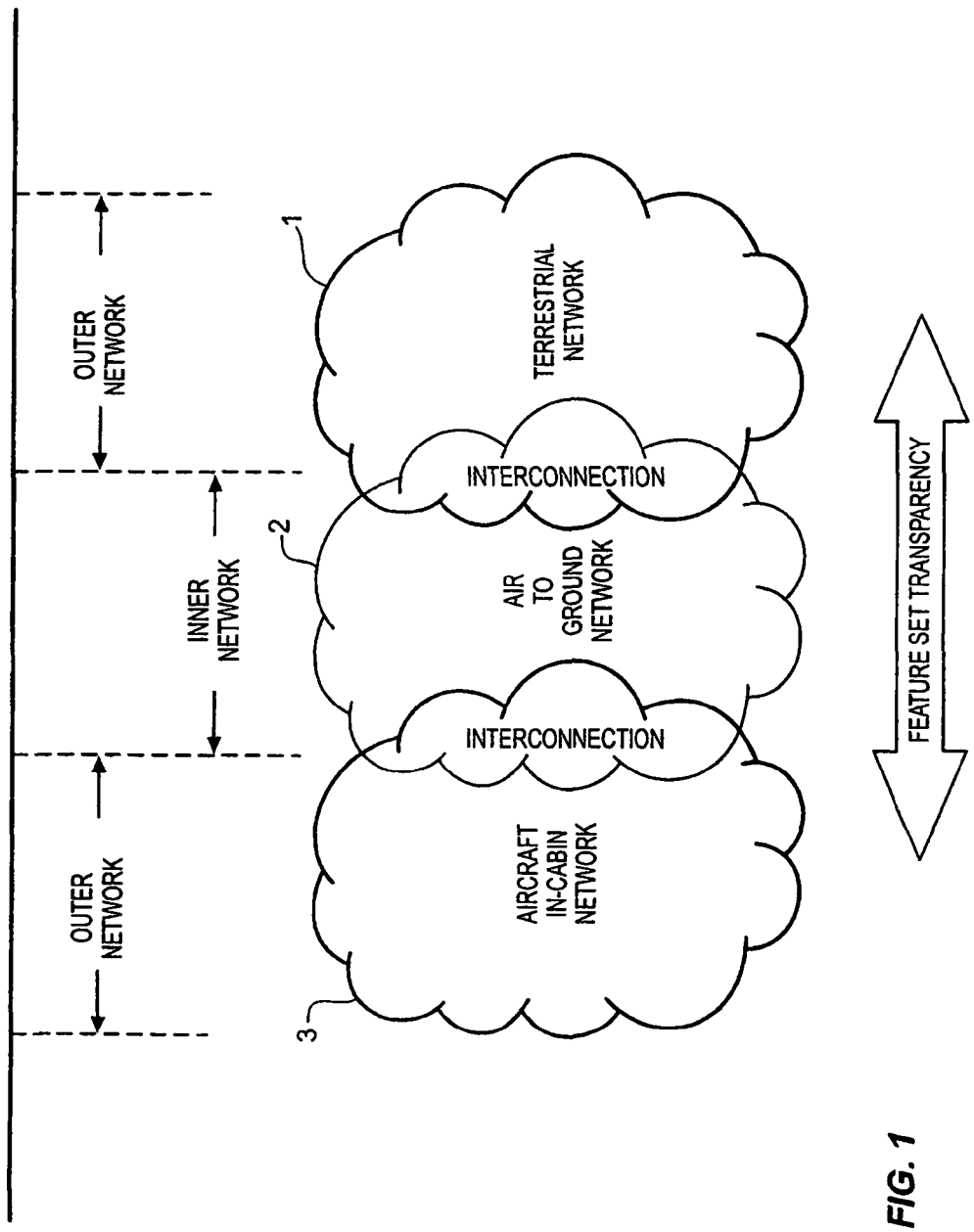
FIG. 1 illustrates, in block diagram form, the overall architecture of a composite air-to-ground network that interconnects an Aircraft In-Cabin Network with a Ground-Based communication Network.

Cellular wireless communication systems provide the service of connecting wireless communication customers, each having a wireless subscriber device, to both land-based customers who are served by the common carrier public telephone network as well as other wireless communication customers. In such a system, if the traffic is circuit switched, all incoming and outgoing calls are routed through a wireless network switch, commonly referred to as a Mobile Switching Center (MSC) or Mobile Telephone Switching Office (MTSO), each of which is connected to a Base Station Subsystem consisting of one or more Base Station Controllers (BSCs), and a plurality of Base Transceiver Stations (BTSs). Each Base Transceiver Station communicates with wireless subscriber devices located within its service area, with the Base Transceiver Stations geographically arranged to collectively provide contiguous service over a large service region. Each Base Transceiver Station in the service region is connected by communication links to a Base Station Controller, and the Base Station Controller is connected by additional communications links to the Mobile Switching Center Each Base Transceiver Station contains a one or more radio transceivers, with the number of transceivers being dependent upon the subscriber traffic generated within the coverage area of the Base Transceiver Station.

The terms "cell site" and "cell" are sometimes loosely used in the literature, and the term "cell site" generally denotes the locations of the Base Transceiver Stations, while the term "cell" generally denotes the region of space which is served by a particular set of transceivers and associated antenna system at a cell site. A "sector" generally refers to the sector-shaped coverage area created when multiple directional antenna systems are used at a cell site to provide greater capacity and/or coverage by sub-dividing the nominally circular coverage area surrounding a cell site into a corresponding number of cells. The particular technology used to implement the communications between wireless subscriber devices and the transmitter-receiver pairs as well as the nature of the data transferred there between, be it voice, video, telemetry, computer data, and the like, are not limitations to the system which is described herein, since a novel system concept is disclosed, rather than a specific technologically limited implementation of an existing system concept. Therefore, the term "cellular" as it is used herein denotes a communication system which operates on the basis of dividing space into a plurality of volumetric sections or cells, and managing communications between wireless subscriber devices located in the cells and the associated transmitter-receiver pairs located at the cell site for each of these cells.

Existing Cellular Technologies

There are several cellular standards or Common Air Interfaces which have widespread use in the wireless industry. The following are examples of typical characteristics of such systems, which all share the common trait of reusing RF channels with a "cellular" reuse pattern.

Advanced Mobile Phone Service (AMPS) utilizes an analog Frequency Modulation on a pair of radio frequency carriers for each cellular call and is therefore a member of the Frequency Division Multiple Access (FDMA) class of cellular services. The AMPS network has a control channel allocation on a per cell/sector basis. The wireless subscriber device "camps on" to the shared control channel when inactive and exchanges signaling information required to assign dedicated traffic channels when required in order to complete inbound or outbound calls. AMPS calls are then set-up to the desired destination as described below. Handoffs of a wireless subscriber device between adjacent cells/sectors in AMPS are require that the subscriber device performs a frequency change as service changes from one cell/sector to the next.

In contrast, the IS-136 standard (also called NA-TDMA), uses a combination of FDMA and Time Division Multiple Access (TDMA) for its access scheme, with each pair of carriers supporting up to three calls on separate time slots. The wireless subscriber device camps on a control channel that is defined as a particular timeslot on a particular RF channel. When the subscriber device requires a traffic channel to originate or complete a call, it is provided with an RF channel and one of the three available timeslots on that channel to set-up and communicate its traffic. TDMA Radio Frequency channel bandwidths are the same as for AMPS and handoffs of the wireless subscriber device in TDMA are similar to AMPS, requiring that the subscriber device perform a frequency change when handing off from one cell/sector to the next.

GSM, or Global System for Mobile communications, also utilizes FDMA and TDMA access, but with marked differences in the management of the RF channel. For a given "RF channel", there are a plurality of timeslots available. The first RF channel utilized in a cell will have at least one timeslot assigned as the common control channel, which continuously broadcasts various signals required for system management as well as signals intended for specific subscriber devices. Timeslots not used for control channel purposes are available for use as traffic channels. Handoffs in GSM require a change of RF channel sequence and time slots when the subscriber device moves to an adjoining cell.

Code Division Multiple Access (CDMA) systems use yet another basic form of multiple access. Central to the operation of CDMA is the development of a system of special code sequences (such as Walsh Codes) that are used to digitally modulate individual the digital traffic signals. The code sequences have the unique property of being "orthogonal" to each other, that is, each on can be completely distinguished from any of the others by mathematical manipulation of the signals—a property survives after modulation by the digital traffic signals. This allows multiple modulated code sequences to be used to modulate a single RF carrier and a receiver to be able to demodulate the complex signal and identify each of the original digitally coded "channels". Each of the original digital traffic signals is thereby recovered. Signaling channels for used to broadcast common information and information for specific subscriber devices are handled using the same coding techniques, using dedicated code channels. Network capacity is expanded in a fashion similar to other cellular systems—by using additional RF channels at each network site and/or subdividing cells into smaller cells. The wireless subscriber device follows a acquisition/registration sequence that is somewhat similar to the FDM/TDM architectures. The mobile "listens" to the pilot channel (a given code word or sequence) from each nearby cell and orders the signals received by signal quality into sets: active, candidate, neighbor, and remaining. The mobile camps on the signal from the best cell and establishes synchronization to decode the broadcast information channels. The mobile can now, through well understood signaling means, perform the registration process and is then ready to receive or make calls. For example, an inbound call (base to mobile) is identified to the mobile via a paging channel (again code separated). The mobile responds it is ready to receive the call, the CDMA systems assigns a traffic code channel to which the mobile transitions and then begins communication with the inbound caller. CDMA has the ability to carry calls in what is termed "soft" handoff wherein the mobile is actually communicating the same content to more than one cell/sector in a time concurrent simultaneous fashion. Soft handoff improves the overall performance received due to the spatial diversity of the respective cells/sectors, and allows handovers to be performed using "make-before-break" handovers that gradually transitions service from one cell to a second cell as the subscriber device moves through the network. CDMA is also capable of hard handoffs, in which the connection to one cell is broken before the call is attached to the second cell, either with or without a change of the RF channel. This is most common between regions within a network or for calls handed off between network providers at the boundary of the two respective networks.

All of the aforementioned architectures, AMSP, TDMA, GSM, and CDMA, operate in a full duplex mode with different RF channels for transmit and receive. Each pair of RF channels has a fixed frequency separation, with the base station transceivers generally operating on the RF channel with the higher frequency.

Call Connection

The first stage of a cellular communication connection is set up when a transmitter-receiver pair in a cell site, operating on a predetermined pair of radio frequencies, is turned on and a wireless subscriber device is tuned to the same pair of radio frequencies. The second stage of the communication connection is between this transmitter-receiver pair and the network interface that connects to the common carrier public telephone network or to another wireless communications system. This second stage of the communication connection is set up in the SSS (Switching Subsystem), which is connected to other networks by incoming and outgoing trunks and data connections. The Mobile Switching Center contains a switching network to switch mobile customer voice signals from the communication link to an incoming or outgoing trunk. A data switching node (PDSN—Packet Data Serving Node—in CDMA systems, or GGSN—Gateway GPRS Support Node—in GSM systems) similarly directs data traffic interconnecting to the public Public Switched Data Network (PSDN) or to other data networks. The Mobile Switching Center controls the actions of the associated Base Station Controllers by generating and interpreting the control messages that are exchanged over data links between the two. The Base Station Controllers at each cell site, in response to control messages from the Mobile Switching Center, control the transmitter-receiver pairs at the cell site (or code word assignment in the case of CDMA). The control processes at each cell site also control the tuning of the wireless subscriber devices to the selected RF channels, time slots and/or code words.

Each cell in the ground-based (terrestrial) cellular communication network comprises a volume of space radially arranged around the cell site transmitting antennas with the region of space typically approximating a cylindrical volume or a portion of a cylindrical volume having limited height. Since all of the wireless subscriber devices are ground-based units (installed in motor vehicles or handheld units) in traditional cellular communication systems, the antenna radiation pattern of the cell site is aligned to be proximate to the ground. For some licensed frequency bands, including the US cellular band, the polarization of the signals produced by the cell site antenna is vertical in nature. For FDMA and FDMA/TDMA systems, in order to prevent the radio signals in one cell site from interfering with radio signals in an adjacent cell site the RF channels for adjacent cell sites are selected to be different, with sufficient frequency separation between adjacent transmitter frequencies to avoid overlapping transmissions among adjacent cell sites. In order to reuse a finite, small number of RF channels with distinct frequencies, the cellular communication industry has developed RF channel allocation patterns that ensures that two adjacent or nearby cell sites do not operate on the same RF Channel (unless they embody a CDMA architecture in which case a re-use pattern is employed in the code domain, i.e., PN codes, instead of frequency domain). When a ground-based wireless subscriber device initiates a call connection, control signals from the local cell site transmitter cause the frequency agile transceiver in the ground-based wireless subscriber device to operate on an RF channel designated for that particular cell. As the ground-based wireless subscriber device moves from one cell site to another, the call connection is handed off to successive cell sites and the frequency agile transceiver in the ground-based wireless subscriber device adjusts the traffic channel utilized by changing its RF channel and timeslot or code channel to correspond to that of the serving cell in which the ground-based wireless subscriber device is presently operational.

This existing ground-based cellular communication system is presently in widespread use and has been designed to eliminate the problem of frequency overlap among adjacent cell sites and to minimize the number of frequencies required to serve vast areas without encountering the possibility of excessive interference. These existing ground-based cellular communication systems, however, are inoperable when the user's wireless subscriber device is non-terrestrial in nature. In particular, the provision of cellular communication services to aircraft is inconsistent with the architecture of the existing ground-based cellular communication network since an airborne mobile subscriber device would be within the effective service area of multiple sites that are re-using the same traffic channel, and would therefore both be likely to receive and create significant levels of interference on the communications channel in use. The antenna patterns of the existing ground-based cellular communication system broadcasts signals in a pattern required to serve terrestrial wireless traffic requirements, and the pattern of RF channel re-use for the individual cells neither is designed to be extensible to providing service to aircraft traveling above the network.

The multi-dimensional cellular communication system proposed herein extends service to wireless subscriber devices that are located in an aircraft in a manner that avoids the possibility of signal interference between the ground-based networks and non-terrestrial wireless subscriber devices. The multi-dimensional cellular communication system adds an overlay of non-terrestrial cells of predetermined geometry and locus in space to the existing terrestrial cellular communication network.

Overall System Architecture

Figure 2:
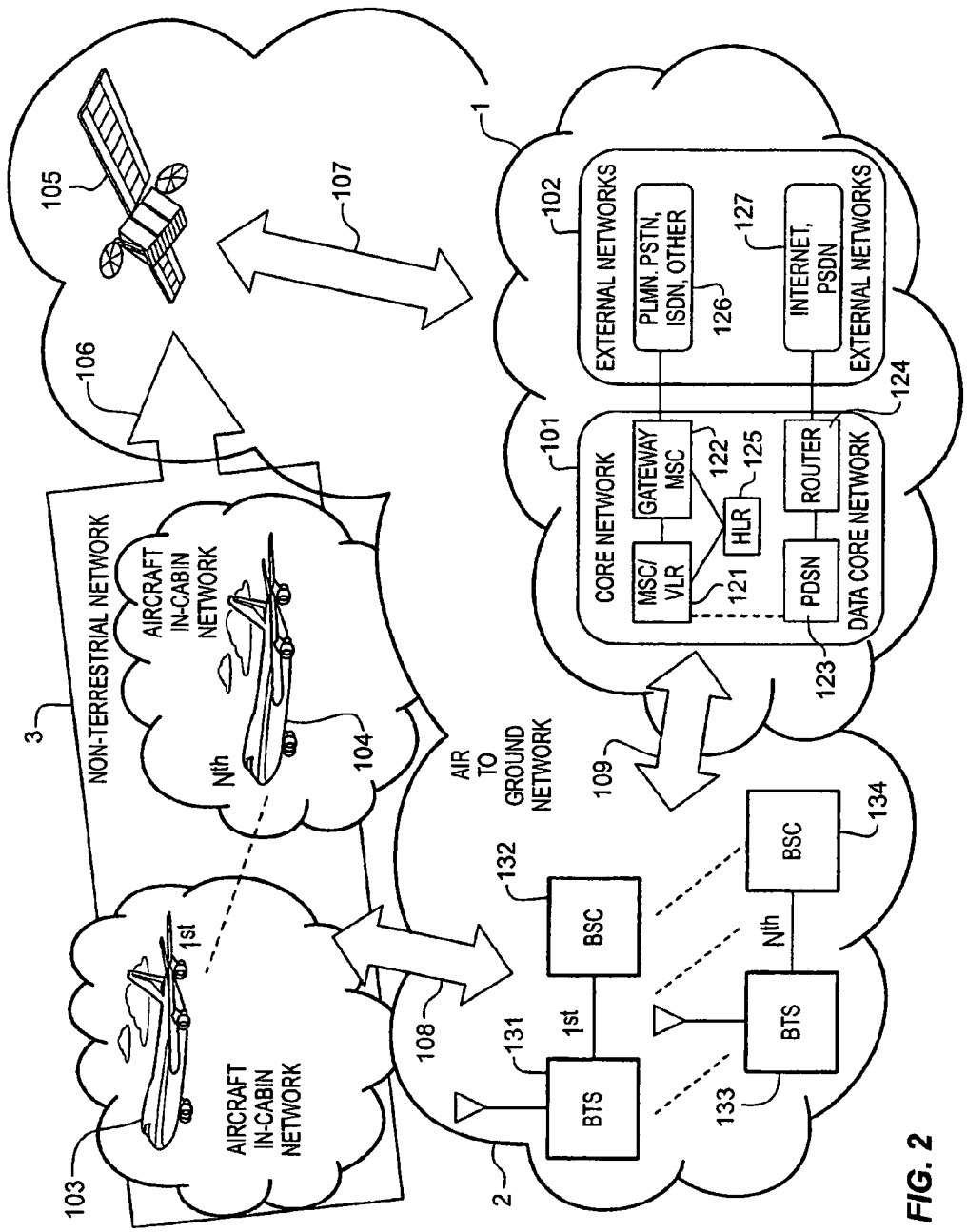
FIG. 2 illustrates, in block diagram form, the key network building blocks for the Non-Terrestrial Feature Transparency System which provides a feature set transparent Air-to-Ground network that interconnects an Aircraft In-Cabin Network with a Ground-Based communication Network.

FIG. 1 illustrates, in block diagram form, the overall architecture of a composite Air-to-Ground Network 2 that interconnects an Aircraft In-Cabin Network 3 with the Terrestrial Network 1 and FIG. 2 illustrates, in block diagram form, the key network building blocks for the Non-Terrestrial Feature Transparency System which provides a feature set transparent Air-to-Ground Network 2 that interconnects an Aircraft In-Cabin Network 3 with a Terrestrial Network 1. These diagrams illustrate the basic concepts of the multi-dimensional cellular communication network and, for the purpose of simplicity of illustration, do not comprise all of the elements found in a typical network. The fundamental elements disclosed in FIGS. 1 and 2 provide a teaching of the interrelationship of the various elements which are used to implement a multi-dimensional cellular communication network to provide feature set transparency to wireless subscriber devices.

The overall concept illustrated in FIGS. 1 and 2 is that the provision of an "Inner Network" that connects the two segments of the "Outer Network," comprising the Aircraft in-Cabin Network 3 and the Terrestrial Network 1, enables feature set transparency. This is accomplished by the Inner Network transmitting both the subscriber traffic (comprising voice and/or other data) as well as control information and feature set data between the Aircraft in-Cabin Network 3 and the Terrestrial Network 1 to thereby enable the wireless subscriber devices that are located in the aircraft 103, 104 to receive services in non-terrestrial regions that are consistent with wireless communication services in the terrestrial (ground-based) networks. The Air-to-Ground Network 2 comprises a set of Base Transceiver Stations 131, 133 and associated Base Station Controllers 132, 134 that are operated by the non-terrestrial cellular service provider and which are connected to the cellular network 101 and thence to the wire-line network 102 of the ground-based (terrestrial) communication network 1.

The cellular network 101 consists of the traditional elements and for the purpose of illustration, is illustrated in pertinent part as consisting of two segments: Core network and Data Core network. The Core Network includes a Mobile Switching Center 121 with its associated Visited Location Register, which is connected to the Home Location Register 125 and the Gateway Mobile Switching Center 122. The Core Network provides interconnection of the voice traffic to the voice transmission segment of the wire-line network 102 which includes various components, including, but not limited to: Public Land Mobile Network, Public Switched Telephone Network, Integrated Services Digital Network, and other such functionalities. The Data Core Network is comprised of the Packet Data Switched Network 123, which is connected to a Router 124, which provides interconnection of the data traffic to the data transmission segments of the wire-line network 102 which includes various components, including, but not limited to: Internet, Public Switched Data Network, and other such functionalities.

Thus, the non-terrestrial cellular communications between the wireless subscriber devices located in aircraft 103, 104 and the cellular network 101 and wire-line network 102 segments of the ground-based communication network 1 are transported via the Aircraft In-Cabin Network 3 and the Air-to-Ground Network 2 to the ground-based Base Transceiver Stations 131-133 and associated Base Station Controllers 132, 134 of the non-terrestrial cellular communication network. The enhanced functionality described below and provided by the Aircraft In-Cabin Network 3, the Air-to-Ground Network 2, the ground-based Base Transceiver Stations 131-133, and associated Base Station Controllers 132, 134 renders the provision of services to the wireless subscriber devices located in aircraft 103, 104 transparent. The following description provides a hierarchical presentation of the basic parameters associated with non-terrestrial cellular communications, noting various architectures that can provide ever increasing levels of communication services, culminating with full feature set transparency.

Air-to-Ground Network

The Air-to-Ground Network 2 shown in FIGS. 1 and 2 is clearly one that is based on wireless communications (radio frequency or optical) between the ground-based cellular communications network 101 and the wireless subscriber devices that are located in the aircraft 103, 104, with the preferred approach being that of a radio frequency connection 108, 109. This radio frequency connection 108 takes on the form of a cellular topology where typically more than one cell describes the geographic footprint or coverage area of the composite Air-to-Ground Network 2. The air-to ground connection carries both subscriber traffic as well as native network signaling traffic.

Alternatively, the Air-to-Ground Network 2 could be achieved through a wireless satellite connection 105-107 where radio frequency links 106, 107 are established between the aircraft 103, 104 and a satellite 105 and between the satellite 105 and the ground-based cellular communications network 101, respectively. These satellites 105 could be geosynchronous (appears to be stationary from an earth reference point) or moving, as is the case for Medium Earth Orbit (MEO) and Low Earth Orbit (LEO). Examples of satellites include but are not limited to: Geosynchronous Ku Band satellites, DBS satellites (Direct Broadcast Satellite), the Iridium system, the Globalstar system and the Inmarsat system. In the case of specialized satellites, such as those used for Direct Broadcast Satellite, the link is typically unidirectional, that is from the satellite to the receiving platform, in this case an aircraft. In such a system, a link transmitting unidirectionally from the aircraft is needed to make the communication bidirectional. This link could be satellite or ground-based wireless in nature as previously described.

Last, other means for communicating to aircraft include broad or wide area links such as HF (High Frequency) radio and more unique systems such as troposcatter architectures.

In this manner, true feature set transparency is achieved. The Air-to-Ground Network 2 can be viewed as the conduit through which the subscriber traffic as well as the control and network feature set data is transported between the Terrestrial Network 1 and the Aircraft In-Cabin Network 3. The Air-to-Ground Network 2 can be implemented as a single radio frequency link or multiple radio frequency links, with a portion of the signals being routed over different types of links, such as the Air to Ground Link 108 and the Satellite Link 105-107. Thus, there is a significant amount of flexibility in the implementation of this system, using the various components and architectural concepts disclosed herein in various combinations.

Voice Over Internet Protocol (VoIP) Network

The Voice over Internet Protocol is a class of networks that uses packetized data streams to carry voice across the packet centric Internet Protocol network. In essence, voice becomes data. For VoIP to be a viable communication mode, the latency and packet delivery reliability must be of a sufficiently high standard that both distortion (missing packets) and delay (slow arriving packets) do not impair the customer's user experience in terms of call intelligibility, call reliability and call availability.

In general, circuit switched systems achieve extremely high reliability and availability performance levels. However, the circuit switched paradigm requires that dedicated circuits are used for call set-up, connection and termination (termination meaning the receiving node accepts and connects the incoming call). Hence, the fixed/variable costs, both capital and operating, for circuit switched calls are higher than that for an IP VoIP connection.

However, while a pure IP voice call (VoIP) has cost advantages, the Internet was not initially designed for low latency applications like voice. Thus, early VoIP services experienced call quality impairments not traditionally seen in circuit switched telephony. But, as overall latency delays are reduced through Internet (TCP/IP) network enhancements, this latency problem is becoming less of an issue. So too is the issue of lost or missing packets, which happen infrequently, are presently being resolved. Thus, a possible alternative is a hybrid architecture, using both circuit and packet switched voice telephony, and having both the Internet and traditional circuit switched components. It is also conceivable that a significant portion of voice telephony could be pure Internet based.

The following table offers a perspective of the types of communication paths a voice call could take:

1. A voice call begins with the circuit switched network for the local loop segment, transitions to the Internet for the intra-system leg as a packet call, and then re-enters the circuit switched domain for final delivery to the end node (or termination in telephony parlance).
2. A voice call never enters the circuit switched domain and, remains a packet switched IP call, from end-to-end.
3. A voice call begins as a circuit switched call, and then at the Central Office (CO), transitions to an IP call where it is delivered to the receiving node.
4. A voice call begins as an IP packet switched call, has its intra-switch segment as a circuit switched call and then is delivered as a VoIP call.

Thus, while the aforementioned scenarios are not all inclusive, it is easy to visualize the many communication path possibilities a voice telephony call can take. And so, the same is true for a VoIP call across the "feature set" transparent non-terrestrial cellular communication network.

For example, a VoIP call could be initiated within the Aircraft In-Cabin Network 3 using VoIP across the WiFi bearer platform. A larger segment of the VoIP data stream is used for subscriber voice traffic while a smaller segment is used to convey VoIP network signaling traffic (such as dialed number and so on). This VoIP call enters the Aircraft In-Cabin Network 3, is conveyed to the ground-based communication network 1 through the Air-to-Ground Network 2 or "inner network" and then re-enters the Internet through the "PDSN" in FIG. 2 along the Data Core Network path. This VoIP call then stays as an IP call to the terminating node.

Alternatively, the Aircraft In-Cabin Network VoIP call across WiFi could enter the Core Network side of the ground-based communication network 1 shown in FIG. 2 and become a circuit switched call from that point through to the terminating node.

Alternatively, a circuit switched call could originate in the ground based PSTN but be bound for a subscriber located within an aircraft while in flight, where this intended subscriber only is capable of a VoIP call format. The signal routing path would enter the ground-based communication network 1, transition from the Core Network side to the Data Core Network, and then be conveyed to the Aircraft In-Cabin Network 3 via the Air to Ground Network 2 (see dotted line at the left of the "Core Network" subsystem).

The system described herein does not limit the various communication path possibilities for a voice telephony call nor does it limit where and when a voice telephony call is circuit or packet switched. Thus, the system is agnostic to what is being conveyed, voice or data or both, where and when and in what mode (circuit or packet). The technological opportunities presented herein represent various alternatives that can be combined to implement the underlying system that is disclosed.

Aircraft In-Cabin Network

The "Aircraft In-Cabin Network" is the communications environment that is implemented in the aircraft 103, 104, and these communications can be based on various technologies, including but not limited to: wired, wireless, optical, acoustic (ultrasonic) and the like. An example of such a network is disclosed in U.S. patent application Ser. No. 09/686,923 filed Oct. 11, 2000 titled "Aircraft-Based Network for Wireless Subscriber Stations."

The preferred embodiment for the Aircraft In-Cabin Network 3 is the use of wireless technology and for the wireless technology to be native to the wireless subscriber devices that passengers and crew carry on the aircraft. Thus, a laptop computer can communicate via a WiFi wireless mode (or via a wired connection, such as a LAN), or a PDA could communicate telephony voice traffic via VoIP (Voice over IP). Likewise, a handheld cell phone that uses the GSM protocol communicates via GSM when inside the aircraft to the Aircraft In-Cabin Network. A CDMA cell phone would use CDMA and an analog AMPS phone would use analog AMPS when inside the aircraft to the Aircraft In-Cabin Network 3. The connection states could be packet switched or circuit switched or both. Overall, the objective on the Aircraft In-Cabin Network 3 is to enable seamless and ubiquitous access to the Aircraft In-Cabin Network 3 for all wireless subscriber devices that are carried by passengers and crew.

The connection of the Aircraft In-Cabin Network 3 to the ground-based network enables technology specific wireless subscriber devices (WiFi, TDMA, GSM, CDMA, VoIP and so on) used by the aircraft passengers and crew to access the set of network and subscriber features that would typically be available on a ground-based network. This is done by conveying network signaling information between the native ground-based network and the like-matched technology specific wireless subscriber devices aboard the aircraft via the Aircraft In-Cabin Network 3. In this manner, the wireless subscriber device population located in the aircraft is spoofed into thinking that the wireless subscriber device is directly connected to its native network (which is actually located on the ground).

Figure 3:
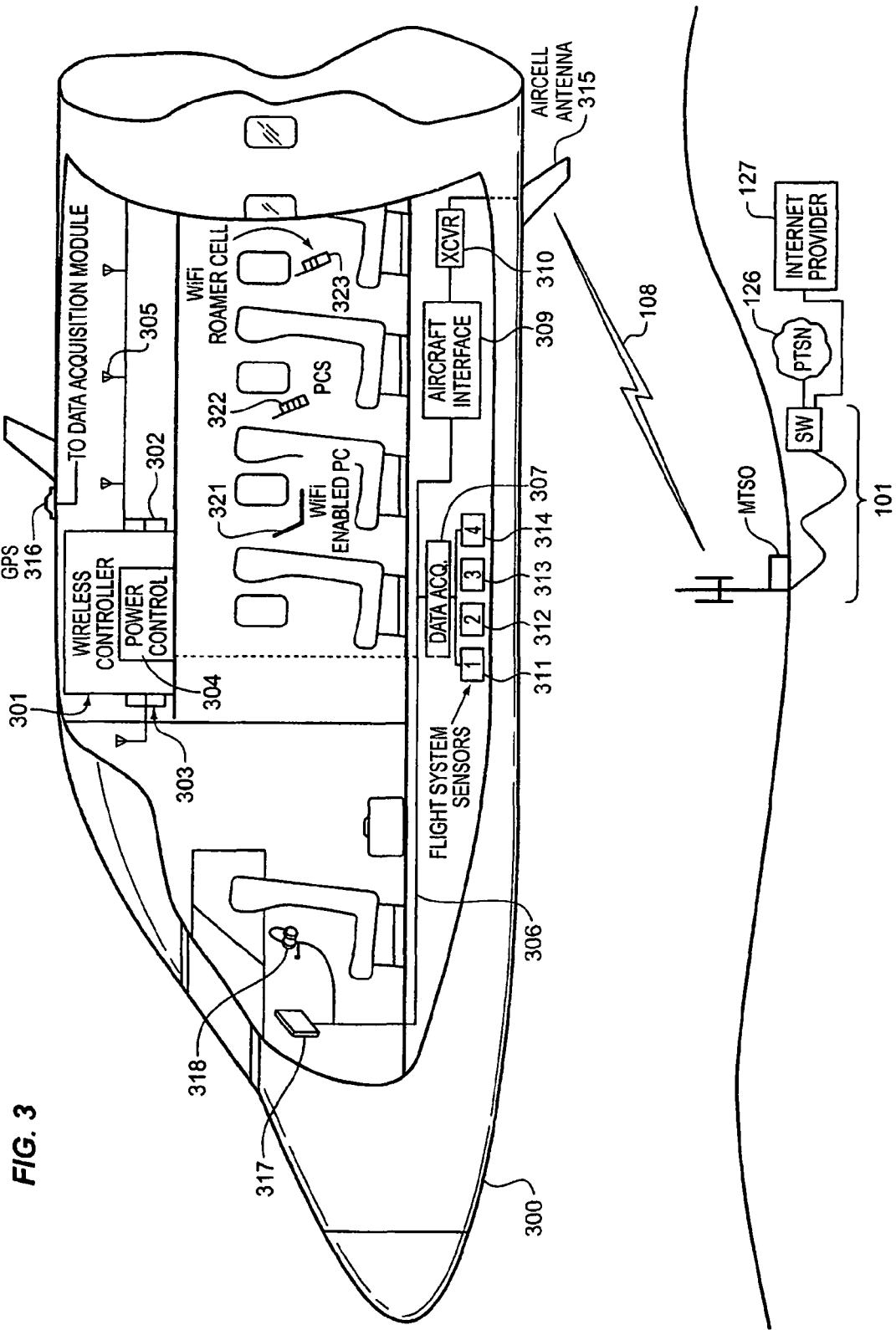
FIG. 3 illustrates, in block diagram form, the architecture of a typical embodiment of a typical aircraft-based network for wireless subscriber stations as embodied in a multi-passenger commercial aircraft.

FIG. 3 illustrates, in block diagram form, the architecture of a typical aircraft-based network for wireless subscriber devices as embodied in a multi-passenger commercial aircraft 300. This system comprises a plurality of elements used to implement a communication backbone that is used to enable wireless communication for a plurality of wireless communication devices of diverse nature. The aircraft-based network for wireless subscriber devices comprises a Local Area Network 306 that includes a radio frequency communication system 301 that uses a spread spectrum paradigm and having a short range of operation. This network 306 supports both circuit switched and packet switched connections from wireless subscriber devices 321-323 and interconnects the communications of these wireless subscriber devices 321-323 via a gateway transceiver or transceivers 310 to the Public Switched Telephone Network (PSTN) 126 and other destinations, such as the Internet 127 or Public Switched Data Network (PDSN). The wireless subscribers thereby retain their single number identity as if they were directly connected to the Public Switched Telephone Network 126. The wireless subscriber devices 321-323 include a diversity of communication devices, such as laptop computers 321, cellular telephones 322, MP3 music players (not shown), Personal Digital Assistants (PDA) (not shown), WiFi-based devices 323, and the like, and for simplicity of description are all collectively termed wireless subscriber devices herein, regardless of their implementation specific details.

The basic elements of the aircraft-based network for wireless subscriber devices comprises at least one antenna 305 or means of coupling electromagnetic energy to/from the Aircraft In Cabin Network 3 located within the aircraft 300 which serves to communicate with the plurality of wireless subscriber devices 321-323 located within the aircraft 300. The at least one antenna 305 is connected to a wireless controller 301 that encompasses a plurality of elements that serve to regulate the wireless communications with the plurality of wireless subscriber devices 321-323. The wireless controller 301 includes at least one low power radio frequency transceiver 302 for providing a circuit switched communication space using a wireless communication paradigm, such as PCS (which could be CDMA or GSM for example). In addition, the wireless controller 301 includes a low power radio frequency transceiver 303 for providing a data-based packet switched communication space using a wireless communication paradigm, such as WiFi (which could also convey packet switched Voice over Internet Protocol (VoIP)). Finally, the wireless controller 301 includes a power control segment 304 that serves to regulate the power output of the plurality of wireless subscriber devices. It also serves to, by RF noise or jamming means, prevent In Cabin wireless subscriber devices from directly and errantly accessing the ground network when in a non-terrestrial mode. The ultra-low airborne transmit power levels feature represents a control by the Power Control element 304 of the wireless controller 301 of the aircraft-based network for wireless subscriber devices to regulate the output signal power produced by the wireless subscriber devices 321-323 to minimize the likelihood of receipt of a cellular signal by ground-based cell sites or ground-based subscriber devices. The power level of the signal transmitted by the wireless subscriber devices 321-323 is typically less than just a few milliwatts for FDMA/TDMA centric wireless subscriber devices (AMPS, TDMA, GSM) and could be as low as −50 dBm for CDMA centric wireless subscriber devices when operated within the In Cabin Network. This magnitude output signal strength represents a significant departure from the standard ground-based cellular signal strength, and the non-terrestrial cellular signals are therefore typically rejected by the ground-based cell sites and ground-based subscriber devices.

It is obvious that these above-noted segments of the wireless controller 301 can be combined or parsed in various ways to produce an implementation that differs from that disclosed herein. The particular implementation described is selected for the purpose of illustrating the concept of the invention and is not intended to limit the applicability of this concept to other implementations.

The wireless controller 301 is connected via a backbone network 306 to a plurality of other elements which serve to provide services to the wireless subscriber devices 321-323. These other elements can include an Aircraft Interface 309 for providing management/switching/routing/aggregation functions for the communication transmissions of the wireless subscriber devices. A data acquisition element 307 serves to interface with a plurality of flight system sensors 311-314 and a Global Positioning System element 316 to collect data from a plurality of sources as described below. Furthermore, pilot communication devices, such as the display 317 and headset 318, are connected to this backbone network 306 either via a wired connection or a wireless connection.

Finally, a gateway transceiver(s) 310 is used to interconnect the Aircraft Interface 309 to an antenna 315 to enable signals to be transmitted from the aircraft-based network for wireless subscriber devices to transceivers located on the ground. Included in these components is a communications router function to forward the communication signals to the proper destinations. Thus, signals that are destined for subscribers on the aircraft are routed to these individuals while signals routed to subscribers located, for example, on the ground are routed to the terrestrial network. Aircraft antenna patterns that typically minimize nadir (Earth directed) effective radiated power (ERP) may be used in the implementation of the antenna(s) 315 on the aircraft to serve the aircraft-based network for wireless subscriber devices. Two commonly used antenna types are a belly mounted blade and a vertical stabilizer mounted blade antenna. The belly mounted blade antenna uses a vertical slot in which the E-Field is horizontally polarized (but it could also be vertically polarized since there is no system limitation preventing such a polarization). This slot antenna has a pattern which is the complement to a dipole arranged in a vertical plane but has orthogonal polarization. The pattern thereby exhibits a null toward the earth (nadir) which is the direction for minimal slant range and hence minimal propagation loss. The level of energy is greatly reduced due to this pattern shaping, but is still orthogonally polarized with respect to ground-based antenna patterns. The second antenna type is a horizontally mounted blade antenna deployed on either side of the vertical stabilizer. This antenna uses a dipole type of radiating element that is horizontally polarized. The horizontal stabilizer of the aircraft is mounted between this horizontally mounted blade antenna and the earth, thereby greatly reducing the power directed toward the earth (nadir). If vertical polarization were used on the aircraft for Air to Ground Network 2 connectivity, a typical antenna type is a vertical ¼ wave monopole physically embedded in an aerodynamic blade housing.

Within the Aircraft In-Cabin Network 3, the wireless subscriber device operates with tightly controlled dynamic power control settings. The Air Interface 309, through its control functions of in-cabin wireless subscriber devices, is programmed to have a very tight dynamic power control range (typically one power step), which power is set very low, as noted above.

Interference Between Non-Terrestrial and Ground-Based Communications

There is a unique set of problems for non-terrestrial communications which the non-terrestrial feature transparency system solves for the aircraft in-cabin environment. One problem is the direct access of the ground-based cellular communications network 1 by the wireless subscriber devices located in the aircraft when the aircraft is airborne. Another problem is the generation of signals that cause interference in the ground-based cellular communications networks, by the operation of wireless subscriber devices that are located in the aircraft. A third problem concerns potential unwanted interference from the In-Cabin Network 3 to aircraft systems/avionics. All problems must be solved to enable the operation of the wireless subscriber devices in the aircraft.

One solution to these problems is to use a jamming device to broadband jam the signal frequencies of interest to thereby prevent the occurrence of the above-noted problems. The jamming signals can be at magnitudes that disable the ability of the wireless subscriber devices located in the aircraft to effectively receive signals from the ground-based cellular communications network 1 but which do not interfere with the normal operation of the desired signals within the cabin. While this method is technologically achievable, it is not the preferred approach, since its implementation is not trivial and raises numerous communication management issues. For example, the jamming spectrum is never constant, because it must be a function of the radio frequency of the air-to-ground link. In addition, if the Aircraft In-Cabin Network 3 is operating in hard handoff mode (frequency change going from one cell to the next) for the air-to-ground link, the jamming device must also take this dynamic spectral allocation change into consideration. It also must be workable for any communication technology used by the wireless subscriber devices. It is also a problem to determine when to turn the jamming device on and off and this determination requires complex decision data, such as aircraft altitude. Also, if the jamming device is enabled, how do you grant emergency access to the aircraft crew to use their wireless subscriber devices? Another issue is whether a broadband jamming device causes EMI/

RFI to the avionics located on the aircraft? Is the ground-based control signals (for a given technology), based on known measurements, significantly high that they occasionally overcome the jamming level? Also, would a given wireless subscriber device lock onto a ground-based control signal? Last, the jamming approach never achieves a true state of control over the aircraft in-cabin wireless subscriber devices. Thus, there are limitations and issues with the jamming approach. But, it may be viable as part of an integrated, systems level approach to managing the Aircraft In-Cabin environment.

While not a pure jamming system, another approach retransmits received ground-based cellular signals but adds sufficient time delay to prevent coherent access to any ground-based cellular signals by wireless subscriber devices located in the aircraft. This "delay" approach can be realized by digitizing the entire received ground-based cellular communications spectrum at the standard assigned cellular radio frequencies, running this digital stream through a digital delay circuit, and then converting the resultant signals back to analog form. Essentially this is an Analog to Digital conversion, signal delay, and finally Digital to Analog conversion. The advancement of the A to D art allows such direct conversion even at UHF radio frequencies.

Another method of preventing coherent access of any ground based cellular signals by the wireless subscriber devices located in the aircraft is to transmit the SIDs (System Identification) of all the ground-based wireless service providers within the aircraft when the aircraft is airborne, in their respective technology types (CDMA, GSM, TDMA, and so on). In this manner, a broadband jamming device is unnecessary since this process can directly control the wireless subscriber devices and commands them to either an idle state or an ultra low power state depending on whether the aircraft is at the target approved OPGA operating altitude. The in-cabin wireless subscriber devices are now under precise and positive control, since they cannot access the ground-based cellular communications network and they cannot cause potential interference to the ground-based cellular communications network or the wireless subscriber devices served by this network.

Another method involves isolating the Aircraft In-Cabin Network 3 through the installation of a RF-opaque surface such as micro-wire or reflective film appliqué to all of the aircraft windows, without impairing passenger window visibility, but in effect, enhancing isolation between the passenger cabin and the ground based cellular network through Faraday cage means well understood in the art.

Transparent Feature Set Air-to-Ground System

Now, that some of the operational considerations have been described, the key network building blocks for a feature set transparent Air-to-Ground Network using ground-based cellular communications as shown in FIGS. 1 and 2 are described. Each aircraft has its own unique Aircraft In-Cabin Network 3 that is wireless in its preferred embodiment, self sufficient, and non-interfering to its own aircraft, adjacent aircraft and/or ground-based cellular operations. A given ground-based wireless node or cell is typically equipped with a plurality of Base Transceiver Stations (BTS) 131, 133, and their associated Base Station Controllers (BSC) 132, 134 which manage the operation of the Base Transceiver Stations 131, 133 as well as other Base Transceiver Stations which may be in proximity to the given cell (adjacent Base Transceiver Stations are typically within handoff distance). It is also possible to have a given Base Station Controller to control more than one Base Transceiver Station. The ground-based cellular communications network 101 provides the final connectivity interface for both customer traffic (voice or data) as well as signaling information that enables feature set transparency. Signaling information is unique to a given wireless architecture (TDMA, GSM, iDEN, CDMA, WCDMA, CDMA2000 and so on).

The implementation of the Air-to-Ground Network 2 is selected based on a number of operational parameters which include but are not limited to: cost (least cost routing), availability, reliability, bandwidth, redundancy and so on. The air-to-ground link could be via wireless cellular 108, 109 or it could be via satellite 105-107. For a satellite based air-to-ground connection, as described previously, the satellite 105 could be a specific platform such as Iridium, or it could be multiple satellite platforms (for example, DBS and geosynchronous Ku band). A typical topology is shown in FIG. 2.

Each aircraft's in-cabin network can independently access the satellite 106 for delivery to the ground-based cellular communications network 1. The ground-based cellular communications network 1 has earth stations which transmit and receive signals from the satellite 106 which is then conveyed to the ground-based cellular communications network 1. These satellite conveyed signals from the Aircraft In-Cabin Network 3 comprise both subscriber traffic (voice and data) as well as signaling data which is native to a given subscriber's device (the signaling data for CDMA is different than that for GSM).

The Aircraft In-Cabin Network 3 provides the mechanism to manage the provision of services to the wireless subscriber devices that are operating in the aircraft cabin. This management includes not only providing the subscriber traffic connectivity, but also the availability of the feature set to which each subscriber is authorized to receive in their home network. Thus, the feature set management requires interfacing with the ground-based cellular network 101 in a manner that renders the location of the wireless subscriber devices transparent, with the Aircraft In-Cabin Network 3 appearing as simply another cell site to the ground-based cellular network 101.

DEFINITIONS

In order to provide consistent use of terminology, the following definitions are provided to describe the various aspects of the present Non-Terrestrial Feature Transparency System and its operation.

Inbound OPGA Signaling: An incoming call directed to the In Cabin Network, whether data or voice or both, to a One Phone Goes Anywhere wireless subscriber device is terminated in the non-terrestrial cellular communication network domain, typically on a wireless basis but the call could have wired segments.

Outbound OPGA Signaling: An outgoing call directed from the In Cabin Network, whether data or voice or both, from a One Phone Goes Anywhere wireless subscriber device is terminated in the ground-based cellular communication network domain, typically on a wireless basis but the call could have wired segments.

Transparent Feature Set Portability: This term describes the seamless transition of authorized/established ground-based cellular communication network features for a wireless subscriber device to the non-terrestrial cellular communication network.

Transparent Subscriber Class Portability: This term describes the seamless transition of authorized/established ground-based cellular communication network classes to the non-terrestrial cellular communication network.

Non-terrestrial Subscriber Classes: This term refers to the creation of new, unique subscriber classes that reside in non-terrestrial cellular communication space which new subscriber classes can also transition to the ground-based cellular communication domain.

Transparent Subscriber Billing: This term refers to the inter-connection and integration of the ground-based billing system to the non-terrestrial billing system so that a subscriber only receives one bill from either the non-terrestrial cellular communication network or from their host ground-based cellular communication network.

Ground-based HLR to Non-Terrestrial HLR Connectivity: This term refers to the inter-connection and integration of the ground-based HLR database, which contains feature and class settings/authorizations for an OPGA wireless subscriber device, to the non-terrestrial HLR database with the objective of seamless and transparent conveyance of these ground-based cellular feature/class data sets to the non-terrestrial network domain.

Ground-based VLR to Non-Terrestrial HLR Connectivity: This term refers to the inter-connection and integration of the ground-based VLR database, which contains feature and class settings/authorizations for an OPGA wireless subscriber device, to the non-terrestrial HLR database with the objective of seamless and transparent conveyance of these ground-based cellular feature/class data sets to the non-terrestrial cellular network domain.

Ground-based HLR to Non-Terrestrial VLR Connectivity: The inter-connection and integration of the ground-based HLR database, which contains feature and class settings/authorizations for an OPGA wireless subscriber device, to the non-terrestrial VLR database with the objective of seamless and transparent conveyance of these ground-based cellular feature/class data sets to the non-terrestrial network domain.

Non-Terrestrial HLR to Ground-based VLR Connectivity: This term refers to the inter-connection and integration of the non-terrestrial HLR database, which contains feature and class settings/authorizations for an OPGA wireless subscriber device, to the ground-based VLR database with the objective of seamless and transparent conveyance of these non-terrestrial cellular feature/class data sets to the ground-based network domain.

Non-Terrestrial HLR to Ground-based HLR Connectivity: This term refers to the inter-connection and integration of the non-terrestrial HLR database, which contains feature and class settings/authorizations for an OPGA wireless subscriber device, to the ground-based HLR database with the objective of seamless and transparent conveyance of these non-terrestrial cellular feature/class data sets to the ground-based network domain.

Ground-based Line Ranges Include Non-Terrestrial Networks: Existing ground-based cellular communication networks need to have a priori information on where to route a packet or circuit switched call to a OPGA wireless subscriber device when this device is in non-terrestrial mode. Therefore, the non-terrestrial line ranges need to be added to switch/router databases in the ground-based cellular communication network.

Non-Terrestrial to Non-Terrestrial Signaling: The non-terrestrial network, through it's updated HLR and VLR databases, routes packet or circuit switched calls, IP data packets and the like from one non-terrestrial wireless subscriber device to a second non-terrestrial wireless subscriber device. The non-terrestrial wireless subscriber devices could be on the same aircraft or on separate aircraft.

Virtual Private Non-Terrestrial Network (VPNN): This term refers to the creation of a virtual private non-terrestrial network through selective access and addressing means using the non-terrestrial network. The VPNN may incorporate ground-based Virtual Private Networks as part of its overall VPNN structure.

Handoffs from Ground-Based Wireless Communication Networks to Non-Terrestrial Wireless Networks: An example of this handoff scenario is where an aircraft takes off from an airport. Any existing calls (or packet or internet architecture data connections) that are terminated in the ground-based wireless communication network are handed over or handed off to the non-terrestrial cellular communication network. As described previously in the HLR/VLR functionality/integration set, all associated features, classes, Virtual Private Networks, Virtual Private Non-Terrestrial Networks of the given wireless subscriber device would also be transferred from the ground-based cellular communication network to the non-terrestrial cellular communication network.

Handoffs from Non-Terrestrial Wireless Networks to Ground-Based Wireless Communication Networks: This is the converse of the previous description. An example is where an aircraft is landing at an airport. Any calls (or packet or internet architecture data connections) terminated on the non-terrestrial cellular communication network would then be handed over or handed off to the ground-based cellular communication network. As described previously in the HLR/VLR functionality/integration set, all associated features, classes, Virtual Private Networks, Virtual Private Non-Terrestrial Networks of the given wireless subscriber device would also be transferred from the non-terrestrial cellular communication network to the ground-based cellular communication network.

Transparent Internet Access: The OPGA wireless subscriber device, when in non-terrestrial mode, seamlessly retains its ability to access the Internet in a user transparent fashion: user access, passwords, user names, data rates, cost, cost premium, IP address (static or dynamic) and so on. In conjunction with Internet access, the IPv6 wireless Internet protocol or similar is more robust in terms of latency, lost packets and other specific bursty and long term error phenomenon associated with wireless access.

Transparent E-mail Access: The OPGA wireless subscriber device, when in non-terrestrial mode, seamlessly retains its ability to access the mail server of designation, whether behind a corporate fire wall or directly accessible through the Internet.

Transparent Multimedia Access: All standard features of the ground-based Internet are readily available to the wireless subscriber device when in the non-terrestrial mode to include: steaming audio, streaming video, multi-player gaming and so on.

Air-to-Ground Link Formats

For the Air-to-Ground Network 2 to/from the aircraft, whether it's ground-based 108, 109 or satellite 105-107 in topology, the information carried on the link can be broken up into a number of architectural formats. In general, the format could convey each in-cabin native technology (CDMA to GSM, for example) in a singular or aggregated fashion. These formats can include but are not necessarily limited to:

1. FDM by technology type (example—frequency block one is for conveying all aircraft in-cabin wireless subscriber devices which are CDMA with the conveyed information comprising both customer originated traffic as well as system level signaling).

2. CDM by technology type (example—Walsh code 1 is used to convey all aircraft in-cabin GSM derived communications to include customer traffic and system signaling).
3. TDM by technology type (example—time slot 1 (of 5 slots per frame) is used to convey all iDEN aircraft in-cabin User Equipment (UEs) information).
4. Voice over Internet Protocol (VoIP).
5. Any combination of the above. For example, if the link from the aircraft were WCDMA-FDD (Wideband CDMA Frequency Division Duplex), this architecture includes elements of CDM, TDM and FDM.
6. Aggregated link: traffic from all aircraft in-cabin OPGA wireless subscriber device technologies are combined into a composite data stream which conveys all customer derived traffic (signaling, data and/or voice) as a single connection, packet or circuit, to/from the aircraft.

The selection of the type of air-to-ground link must take into consideration system performance parameters inherent to wireless connectivity such as:

1. Bursty errors (short term transient events where the link is momentarily impaired; often caused by a propagation anomaly);
2. Propagation characteristics (Rayleigh, rician and log-normal propagation fades);
3. Systemic errors (inherent errors typical of the link mode selected);
4. System Availability (the time a network is up and operational);
5. Equipment Reliability (is the equipment redundant?);
6. Link Reliability (does the link guarantee packet/content delivery?); and
7. Redundancy (single versus dual path to/from the aircraft).

The selected implementation of the Air-to-Ground Network 2 must provide a minimal target level of performance to be acceptable as a viable architecture. Of critical importance, the air-to-ground link must ensure feature set transparency to achieve true OPGA functionality in the aircraft.

Non-Terrestrial Feature Transparency System

As might be expected, the degree of subscriber feature transparency directly impacts the system's overall complexity—the more feature rich, the more complex is the system which enables the feature transparency. As always, there are economic trade-offs that must be balanced with the preferred technological approach. With this thought, three general preferred embodiments for the Non-Terrestrial Feature Transparency System are described herein:

1.) "Full Feature, Single Customer";
2.) "Pre-Paid and/or Own Customer"; and
3.) "Full Feature, Any Customer".

The latter two architectures describe a multi-mode aircraft in-cabin environment where the Aircraft In-Cabin Network 3 can support multiple technology types ranging from CDMA to GSM to WiFi. While this is the preferred embodiment, the feature transparent network may also comprise one single preferred in-cabin technology and could, for example, be dedicated to GSM only operation in the cabin while the Air-to-Ground Network 2 could be terrestrial CDMA or satellite based, or the native in-cabin technology could be CDMA and the link off of the aircraft could also be CDMA.

Non-Terrestrial Feature Transparency System—Full Feature, Single Customer Technology The first embodiment of a ground-based deployed Air-to-Ground Network 2, "Full Feature, Single Customer Technology", offers full OPGA transparent functionality but only for one type of in-cabin technology (such as GSM). Given that present and future cellular technologies are moving towards a limited number of standards, this "single customer technology" approach has merit from a marketing perspective. It is also considerably less complex and offers multiple inter-network interface options between the Aircraft In-Cabin Network 3 and the Air-to-Ground Network 2. This is particularly true if the selected air-to-ground technology is FDM in terms of divided control and traffic functions of the wireless air interface (or protocol).

For the "Full Feature, Single Customer Technology" architecture, there are three general topologies to consider:

1. "Native Mode";
2. "Relator"; and
3. "Resident Cellular Infrastructure".

Native Mode

The first of the three Full Feature, Single Customer Technology architectures is the Native Mode which has direct wireless subscriber device in-cabin access to a ground-based cellular communications network 1. There is no special communication equipment in the aircraft cabin, although higher gain antennas on the ground may be required. These higher gain antennas would likely have to track the aircraft to maintain a high quality link.

The key advantages of native mode are: no airborne equipment cost, system upgrades always occur on the ground, no special modifications are necessary to user wireless subscriber device, with proper antennas on the ground can use an exiting network. The key disadvantages of this approach includes: difficulties avoiding interference with other pure ground-based cellular communication networks, establishing sufficient link margin, keeping aircraft in-cabin transmit power levels sufficiently low to avoid interference with the aircraft avionics. This approach also requires a separate ground-based communication network 1 for each type of aircraft in-cabin technology—not a very cost efficient approach.

Relator

The Relator topology is the second of the three Full Feature, Single Customer Technology architectures and is a methodology wherein equipment on the aircraft has the combined functionality of a "translator" and a "repeater," an example of which is described in U.S. Pat. No. 6,650,898. This equipment typically operates only in the RF domain and does not work on base band signals. The general concept behind a "Relator" is to separate the control functions from the traffic functions. This separation is more easily achieved in the frequency domain for architectures like analog AMPS, TDMA and GSM. This approach is more difficult for CDMA since the code domain cannot be filtered by an FDM type of device (the Relator). Functionally, the Relator transports content traffic by directly relaying in-cabin traffic by an RF means through receiving the signal with an in-cabin antenna and amplifying the signal for transport off of the aircraft via an external aircraft antenna. The signal off of the aircraft may be at a different frequency than that originated in the cabin. This is a reciprocal process for signals emanating from the ground. Since it is desired to remove and modify (adjust or change) the control channel signals and information that are used for a pure ground-based cellular system, the control channel for a given FDM technology is stripped off at the Relator and an in-cabin version is thereby substituted. The overall advantage of this approach is low cost, control of in-cabin devices and re-use of ground-based cellular communication networks designed for air-to-ground communication. The disadvantage is that it's extremely difficult to support more than one in-cabin technology type.

Resident Cellular Infrastructure

Figure 4:
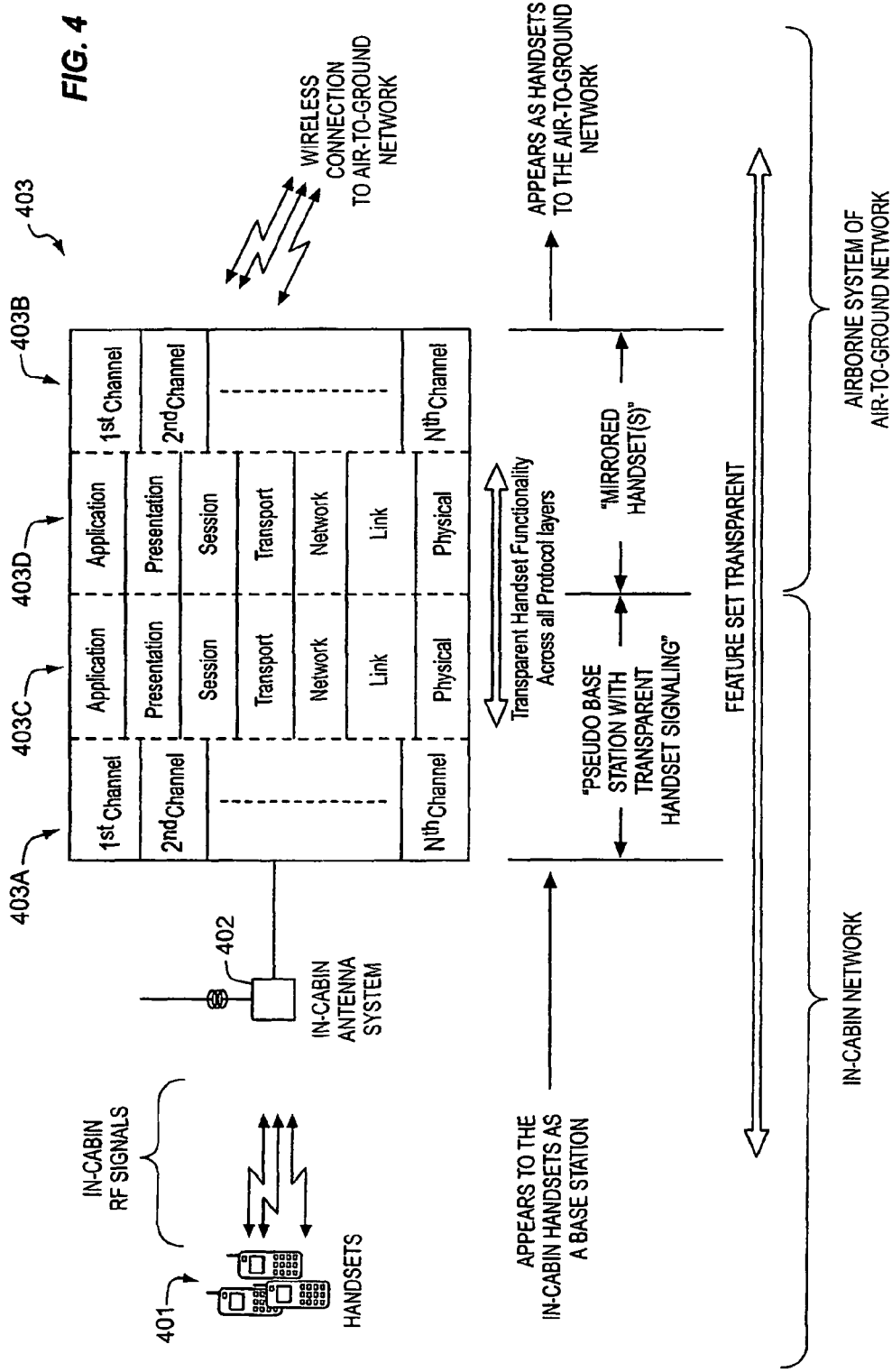
FIGS. 4 and 5 illustrate, in block diagram form, the architecture of the Resident Cellular Infrastructure for the Full Feature, Single Customer Technology for the Air-to-Ground Network.
Figure 5:
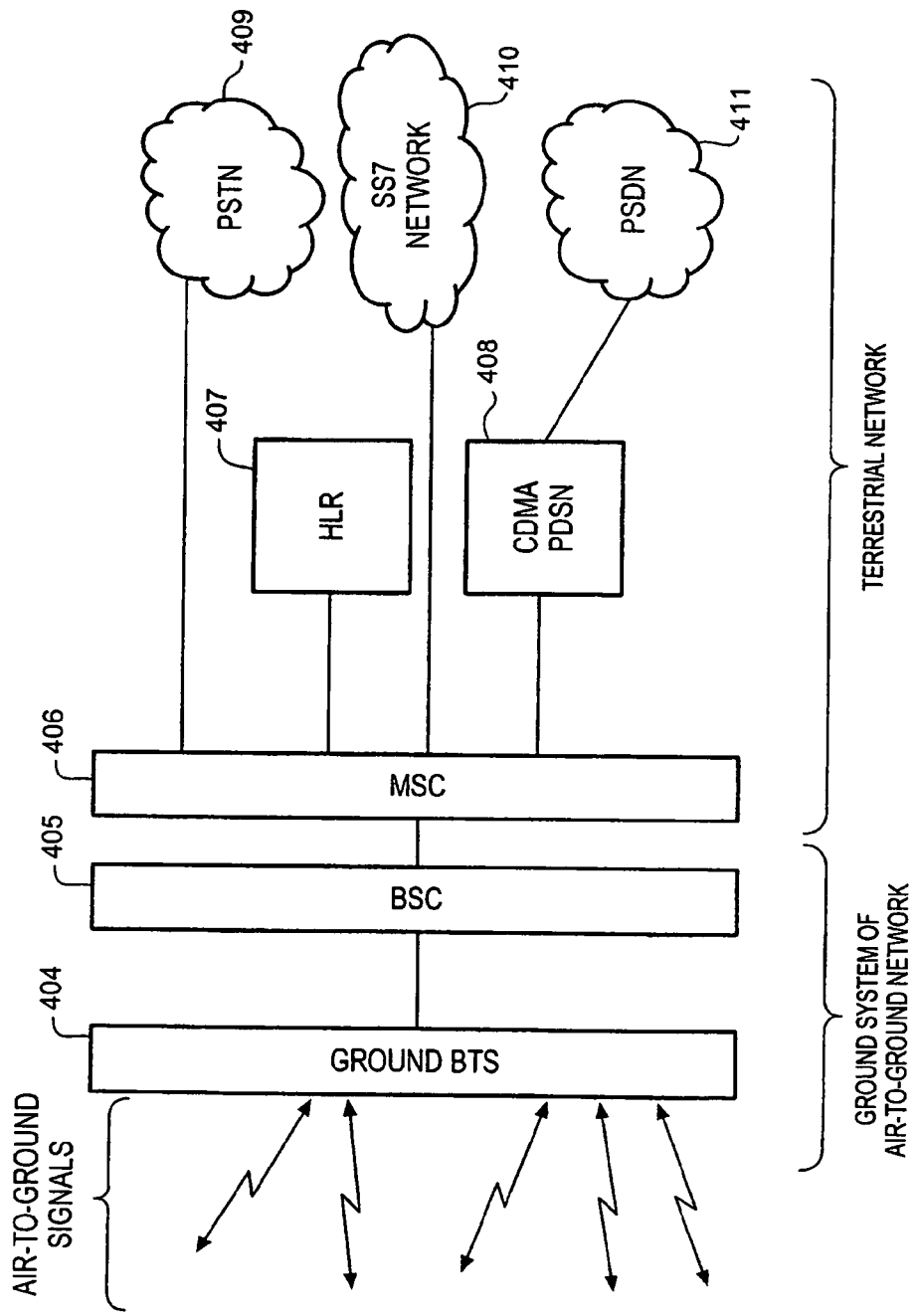

FIGS. 4 and 5 illustrate, in block diagram form, the architecture of the Resident Cellular Infrastructure for the Full Feature, Single Customer Technology for the Air-To-Ground Network, which is centered on just one in-cabin technology (such as CDMA). The Resident Cellular Infrastructure architecture is a "logical" systems concept for enabling a feature transparent non-terrestrial network. This architecture works well for a cellular service provider that has a large existing customer base which can therefore become "instant" customers for aircraft in-cabin service. Much of the ground-based communication network 1 is reused and feature set transparency for the specific device used by the provider's customers is maintained. It is very difficult to offer services to other carrier's customers, even if they are have identical technology, due to issues such as billing and lack of feature transparency to "roaming" subscribers. However, cost advantages of this approach are significant, both for the aircraft and on the ground (wireless network).

The top-level technical description of the Resident Cellular Infrastructure for the Full Feature, Single Customer Technology for the Air-To-Ground Network architecture follows.

The wireless subscriber devices 401 are identical to those used on the cellular/PCS ground-based communication network 1; however, these wireless subscriber devices 401 are pre-registered with the carrier serving the aircraft or users have PIN numbers for authentication. In addition, an antenna 402 interconnects the wireless subscriber devices 401 with the in-cabin Air Interfaces 403. The Aircraft Interface 403 performs the wireless subscriber device mimicking function in the aircraft cabin, as described below by using identical wireless "air interfaces" within and to/from the aircraft. The "air interface" is the technology type used, for example GSM or CDMA, and is not to be confused with the Aircraft Interface 403, which has other functions including managing the protocol barrier.

In the ground-based communication network 1, the Base Transceiver Station 404, Base Station Controller 405, Mobile Switching Center 406 modules for the chosen air-interface/frequency-band of operation interface with the non-terrestrial service provider's Home Location Register 407 to access the MINs of the Aircraft Interface 403 phones as the virtual subscribers for the call connection. In addition, the Mobile Switching Center 406 is connected to the Public Switched Telephone Network 409, SS7 Network 410 and Public Switched Data Network 411 for call completions.

The in-cabin Aircraft Interface 403 in this architecture have multiple responsibilities: (1) manage the in-cabin RF environment to control wireless subscriber device access to services; (2) manage the EMI/RFI environment by commanding the wireless subscriber devices to the lowest necessary RF power; and (3) establish an RF scheme for signaling and traffic which does not cause interference to operations in the ground-based communication network 1. The Aircraft Interface 403 consists of two sets of channels 403A, 403B, each of which provides radio frequency interfaces to the wireless subscriber devices 401 and the ground Base Transceiver Station 404, respectively. The first set of channels 403A provides pseudo base station with transparent handset signaling, to mimic the operation of the Base Transceiver Station 404 to the wireless subscriber devices 401. The second set of channels 403B provides mirrored handset signaling to mimic the operation of the wireless subscriber devices 401 to the Base Transceiver Station 404. These two sets of channels use the typical protocol stacks 403C, 403D to transport the functionality of the wireless subscriber devices 401 between the two Air Interfaces. Thus, the Air Interface 403 bridges the Aircraft In-Cabin Network traffic signals to the Air-to-Ground Network 2.

Resident Cellular Infrastructure Topologies

There are two general topologies for the "Resident Cellular Infrastructure" method:
1. Moving Cell and
2. Moving Subscriber.

Resident Cellular Infrastructure—Moving Cell

FIG. 11 illustrates, in block diagram form, the architecture of the Moving Cell implementation of the Resident Cellular Infrastructure for the Full Feature, Single Customer Technology for the Air-to-Ground Network. The Moving Cell architecture is present when the aircraft in flight appears as a "cell" that serves a plurality of wireless subscriber devices, but is in motion. That is, all of the in-cabin calls for the selected in cabin technology are "terminated" on the aircraft 103 from a conventional telephony perspective, in that there appears to be a communication path to the aircraft for each active call, as illustrated by the n Channels illustrated in FIG. 11.

Therefore, in this configuration, all of the necessary equipment, hardware and software, that is normally on the ground and necessarily sufficient to comprise a cellular base station, must be installed on the aircraft (BTS and BSC with local/remote MSC connectivity). Architecturally, traditional cellular is presently not designed to have a "cell" move in relation to other cells. Issues such as an entire cell of active wireless subscriber devices handing off to another cell are not contemplated in today's cellular networking standards. In addition, the present internal signaling paradigm for cellular network management becomes dysfunctional when contemplated in a Moving Cell topology (signal routing maps and inter-cell connections are no longer static). In addition, feature set transparency becomes increasingly difficult.

Resident Cellular Infrastructure—Moving Subscriber

The Moving Cell approach is simplified if a "network within a network" topology is taken as described herein for "Full Feature, Any Customer". For this advanced and highly integrated architecture, the Air-to-Ground Network 2 is simply a wireless transport pipe (inner network) for what is in essence a moving cell that resides in an isolated environment, namely the aircraft 103 (one end of the outer network). In this manner many complex technical difficulties are thereby solved from the general "Moving Cell" concept. Detailed discussion concerning the "Full Feature, Any Customer" platform are contained in later sections of this document.

FIG. 12 illustrates, in block diagram form, the architecture of the Moving Subscriber implementation of the Resident Cellular Infrastructure for the Full Feature, Single Customer Technology for the Air-to-Ground Network. The complex issues with the Moving Cell approach are also solved if the Moving Cell is modified to become a Moving Subscriber topology. Conceptually, if the Aircraft In-Cabin Network can present itself or appear to the Air-to-Ground Network 2 as acting and behaving like a "subscriber terminal" as illustrated by the single air-to-ground link in FIG. 12, which represents one or more aggregated channels to carry the traffic for the plurality of wireless subscriber devices located in the aircraft. Thus, the Air-to-Ground Network 2 and the ground-based communication network 1 manage the Aircraft In-Cabin Network subscriber terminal (or User Equipment) in a manner that is identical to that done for ground-based wireless subscriber devices. In essence, the Air-to-Ground Network 2 and the ground-based communication network 1 are spoofed into thinking that the wireless subscriber devices have no special considerations associated with their operation, even though the wireless subscriber devices are located on an aircraft in flight.

Resident Cellular Infrastructure Summary

The Resident Cellular Infrastructure topology is a "logical" systems concept for a feature transparent non-terrestrial network having a preferred "Moving Subscriber" embodiment. In essence, the Resident Cellular Infrastructure architecture requires that the systems on board the aircraft replicate the full functionality of a given wireless subscriber device at a piece of equipment that mimics the wireless subscriber device within the aircraft. This mirroring of wireless subscriber device attributes enables a localized cell for in-cabin communication yet retains the same wireless subscriber device attributes for the Air-to-Ground Network 2. Thus, the Air-to-Ground Network 2 is not aware that the wireless subscriber devices are non-terrestrial or multidimensional—the Aircraft In-Cabin Network 3 is operationally transparent to the Air-to-Ground Network 2 since the two networks are paired one-for-one in a channelized scheme.

For the Resident Cellular Infrastructure architecture, it is important to recognize that a number of system signaling parameters must be managed uniquely and independently on either side of the protocol stack interface (Air-to-Ground Network 2 side versus Aircraft In-Cabin Network 3 side). For example, dynamic power control would be controlled separately on the Air-to-Ground Network 2 versus the Aircraft In-Cabin Network 3 (where very low transmit powers are desired and the purpose of Dynamic Power Control takes on a different functionality). In addition, handoff signaling to include soft handoff would be active in the Air-to-Ground Network 2 but would likely be inactive within the cabin environment. Thus, for these examples and all the other system signals that are unique and singly important for only that respective half of the link, the Aircraft In-Cabin Network 3 would intercept, not forward along or spoof the other half of the collective network in a manner consistent with both halves operation. So, while most of the signals in the protocol stack are conveyed seamlessly across the protocol barrier, key signals are managed individually on a case-by-case basis. In some respects, the Resident Cellular Infrastructure concept is an intelligent "Relator" working in the signaling domain versus a pure radio frequency domain.

The key disadvantage of the Resident Cellular Infrastructure concept is that it is a single technology approach and requires like technologies for the Aircraft In-Cabin Network 3 and the Air-to-Ground Network 2. It also is a single service provider topology. As discussed previously, for a cellular service provider that already has a substantial single-technology subscriber population, this single technology architectural weakness may be inconsequential.

Figure 6:
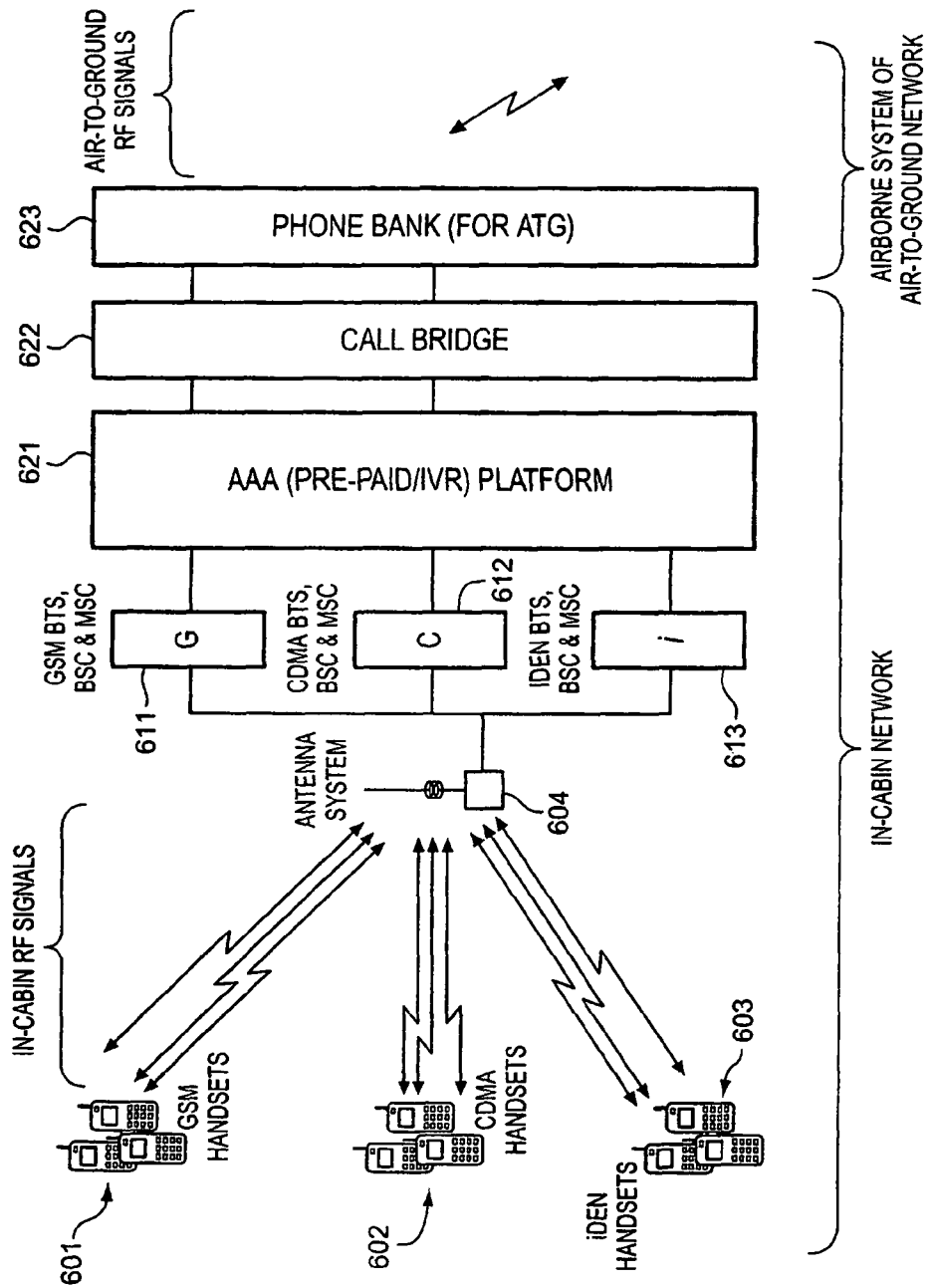
FIGS. 6 and 7 illustrate, in block diagram form, the architecture of the Prepaid and/or Own Subscriber topology for the Air-to-Ground Network.
Figure 7:
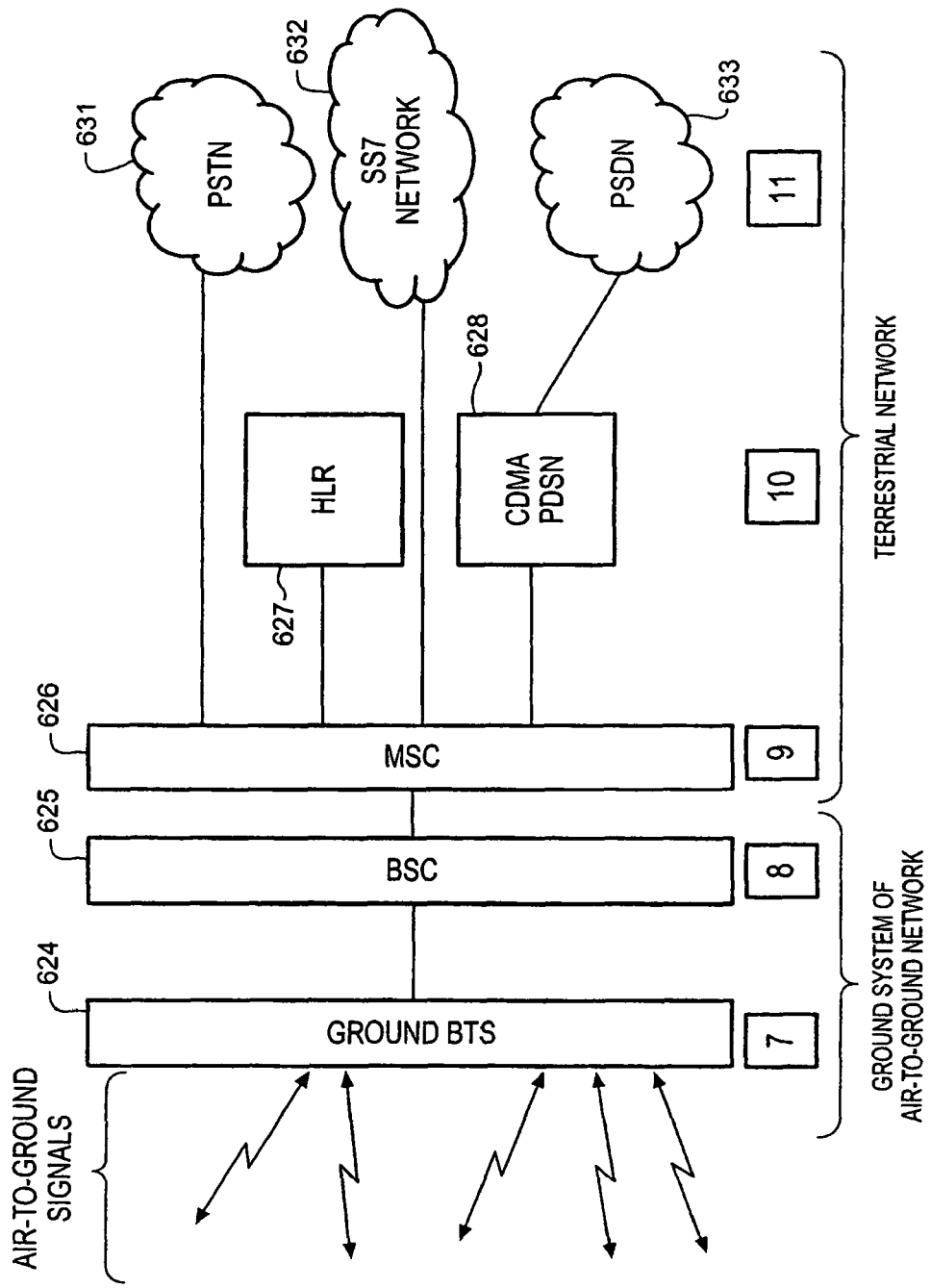

Non-Terrestrial Feature Transparency System—Pre-Paid and/or Own Customer Topology FIGS. 6 and 7 illustrate, in block diagram form, the architecture of the Prepaid and/or Own Subscriber topology for the Air-To-Ground Network 2. The second embodiment, "Pre-Paid and/or Own Customer", while able to offer service to more technology types within the cabin, does not offer a rich set of feature transparency to the subscriber. In general, the preferred embodiment is a "Moving Cell" type of topology (FIG. 11). However, it is substantially less complex and much simpler to operate than "Full Feature, Any Customer". It may also be more robust in terms of reliability and availability since it is less complex. This architecture has the following advantages and disadvantages:

Advantages—
1. No roaming agreement required with other carriers. While airborne, users of the system are subscribers of the carrier providing the service.
2. Today's ATG network (AMPS) can used to offer service (i.e. be the Air-to-Ground Network 2).
3. Minimum customization of off-the-shelf modules (faster to market and less technology risk).
4. Billing/collection is simplified.
5. Subscribers' home service provider can't block access Disadvantages—
1. Basic call capability exists but not all the feature sets are available such as: call waiting, caller ID, 3-way calling, SMS, voice mail notification and so on.
2. Outbound calling only, since inbound calls are more difficult to manage/deliver and are not generally supported.
3. Multiple codec's, at least two, may impact voice quality.
4. Packet switched data network/capability might require modifications to the network.

The top-level technical description of the "Pre-paid and/or Own Subscriber" architecture follows.

The wireless subscriber devices 601-603 are identical to those used on the cellular/PCS ground-based communication network 1; however, these wireless subscriber devices 601-603 are pre-registered with the carrier serving the aircraft and/or users have PIN numbers for authentication. In addition, an antenna 604 interconnects the wireless subscriber devices 601-603 with the in-cabin Base Transceiver Stations (BTS) 611-613, which are typically pico-cells with BSC/MSC functions integrated. BTS/BSC/MSC modules are added for each air-interface technology supported.

The AAA (authentication, authorization and accounting) platform 621 performs a subset of the HLR functions in the aircraft cabin (authentication can be based on MIN or PIN; interface into billing system may be required and can possibly be done over a satellite link as a distinctly separate signaling path). The Call Bridge 622 acts as the bridging function (for media/content and signaling to a limited extent) between the Aircraft In-Cabin Network 3 and the ground-based communication network 1. Upon instruction from the MA platform 621, the Call Bridge 622 places a call using the Phone Bank module 623 to the ground-based communication network 1 and bridges the call to the Aircraft In-Cabin Network 3.

The Air-to-Ground (ATG) Network 2 uses a frequency band and air-interface technology of the designer's choice (e.g. AMPS or CDMA operating in the cellular or NATS bands) to link the Aircraft in-Cabin Network 3 and the ground-based communication network 1. In the ground-based communication network 1, the Base Transceiver Station 624, Base Station Controller 625, Mobile Switching Center 626 modules for the chosen air-interface/frequency-band of operation interface with the non-terrestrial service provider's Home Location Register 627 to access the MINs of the Phone Bank module 623 phones as the virtual subscribers for the call connection. In addition, the Mobile Switching Center 626 is connected to the Public Switched Telephone Network 631, SS7 Network 632 and Public Switched Data Network 633 for call completions.

The in-cabin Base Transceiver Stations (BTS) 611-613 in this architecture have multiple responsibilities: (1) manage the in-cabin RF environment to control wireless subscriber device access to services; (2) manage the EMI/RFI environment by commanding the wireless subscriber devices to the lowest necessary RF power; and (3) establish an RF scheme for signaling and traffic which does not cause interference to operations in the ground-based communication network 1. The BTS, BSC and MSC components of the various in-cabin Base Transceiver Stations (BTS) 611-613 convert the Aircraft In-Cabin Network traffic signals to base band information which is then bridged to a wireless phone bank 623 for connection to the Air-to-Ground Network 2. No signaling information crosses the boundary between the Aircraft In-Cabin Network 3 and the Air-to-Ground Network 2. Therefore, this architecture is not subscriber feature transparent; rather, it is a functional topology which enables multi-handset technology support in the aircraft cabin for primarily for circuit-type voice or data calls, and primarily for subscriber originated traffic. Since there is no signaling information with respect to subscriber registration, the ground-based communication network 1 has no updated knowledge of which subscriber handsets are airborne. Likewise, no a priori information is available. Thus, inbound calling, ground to air, is not supported in this architecture.

An outbound (air to ground) call begins with the in-cabin wireless subscriber devices initiating a call request. The combination BTS/BTS/MSC, through known, standard cellular call set-up processes, establishes a call. This process is air interface dependent with GSM having a different protocol/methodology than CDMA. After converting the subscriber traffic to base band (either digital audio or pure data), and extracting essential signaling information such as the number to be called as well as the calling number, the AAA Platform 621 performs authentication, authorization and accounting functions. After completing the AAA process, the outbound call is passed through a Call Bridge 622 to the Phone Bank 623 for transport to the ground-based communication network 1. The Phone Bank 623 receives the calling number and the called number from the Call Bridge 622. The Phone Bank 623 is at the airborne end of the Air-to-Ground Network 2; the Air-to-Ground Network 2 can be any technology type and does not have to be similar to one of the Aircraft In-Cabin Network 3 air interfaces. The preferred embodiment uses a channelized approach although an aggregated pipe could also be used (see "Full Feature, Any Customer"). On the ground, the Air-to-Ground Network 2 is virtually identical to a standard cellular topology (but has skyward looking antennas and is designed to manage communications to/from aircraft with associated special handoffs and so on).

Non-Terrestrial Feature Transparency System—Full Feature, Any Customer

Figure 8:
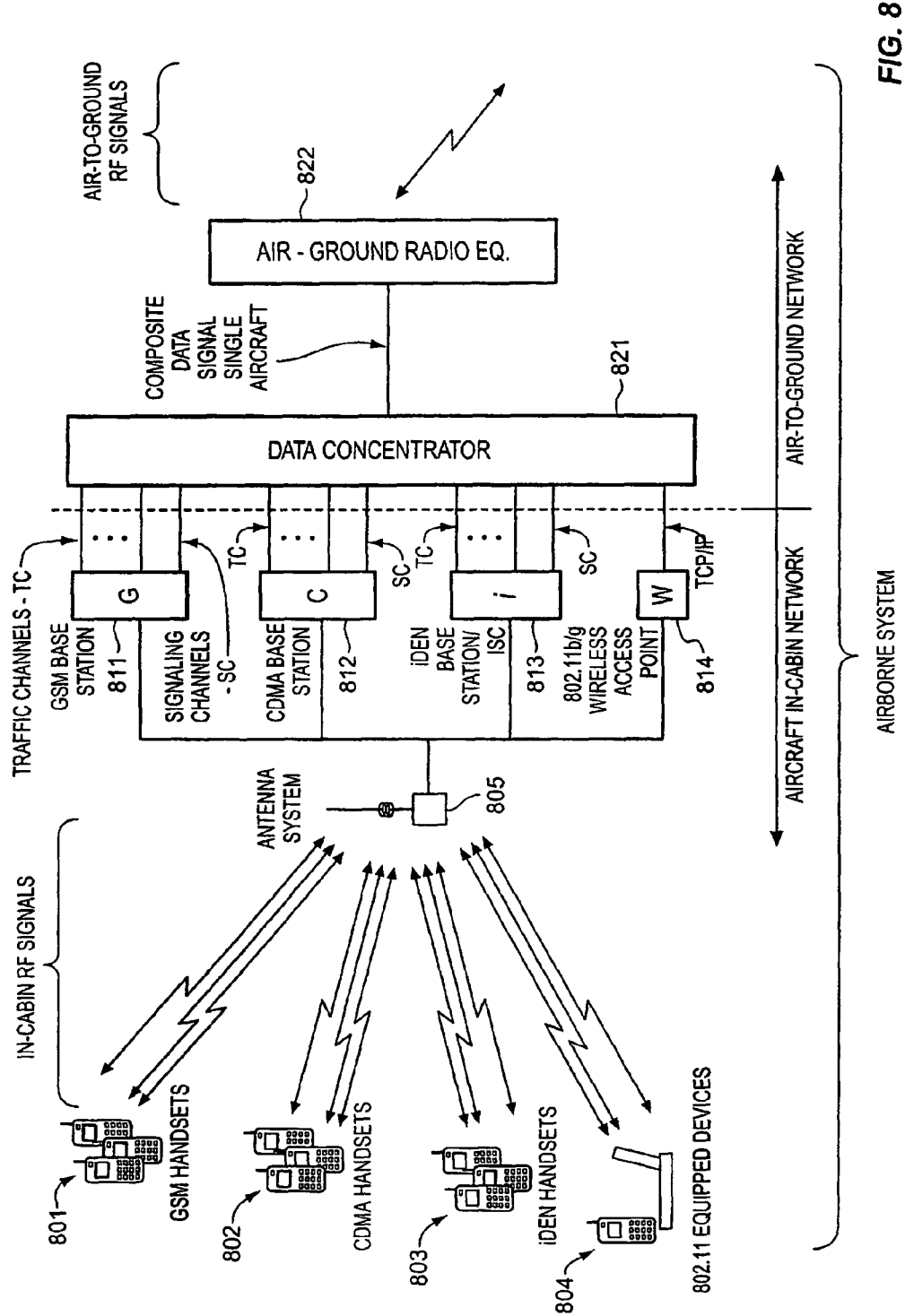
FIGS. 8 and 9 illustrate, in block diagram form, the architecture of the Full Feature, Multiple Customer topology for the Air-to-Ground Network.
Figure 9:
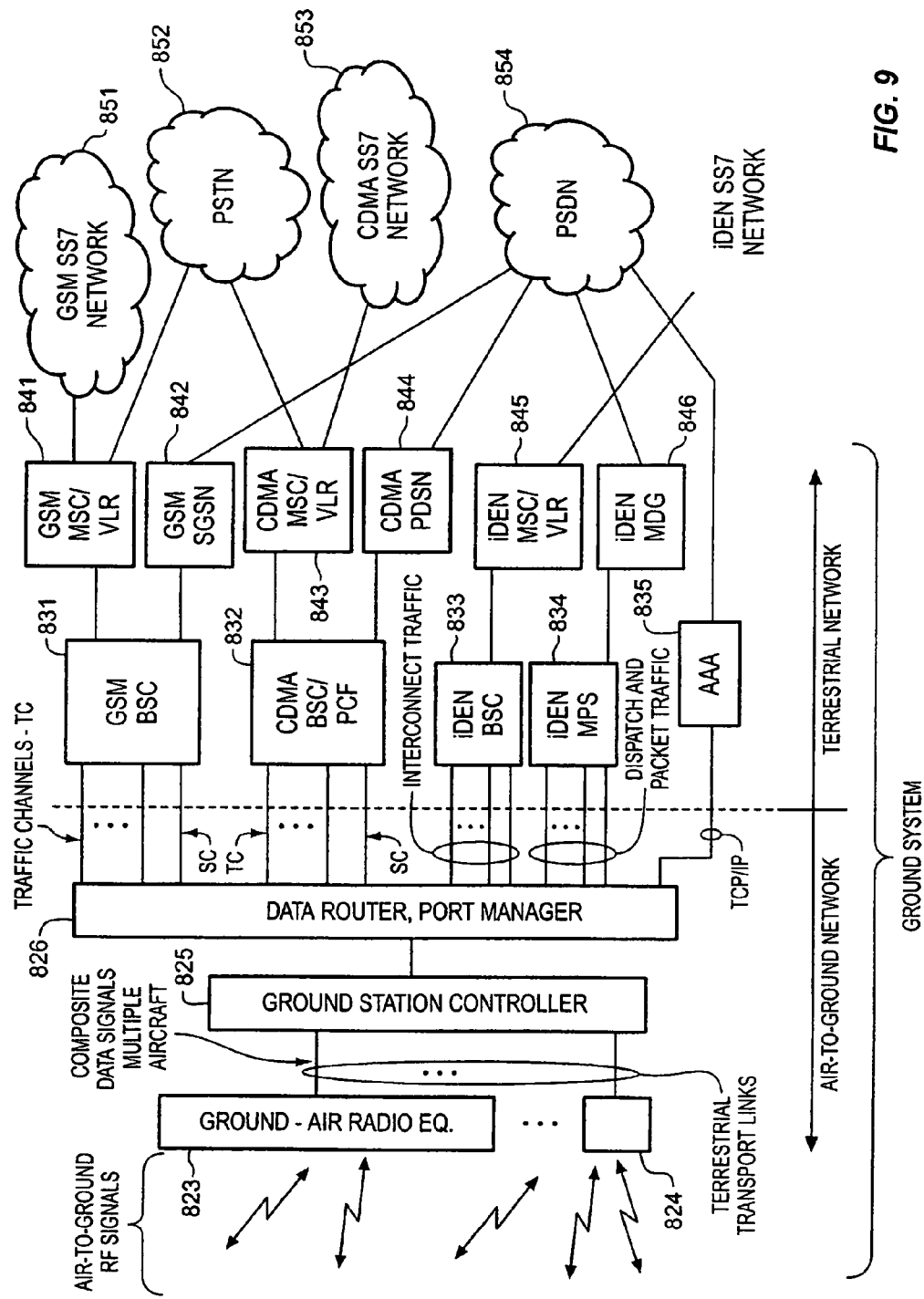

The third, feature rich architecture called "Full Feature, Any Customer" is illustrated in FIGS. 8 and 9. This architecture, while more complex, achieves true One Phone Goes Anywhere (OPGA) functionality. This architecture's advantages and disadvantages include:

Advantages—
1. Full "native" network feature set availability when on-board the aircraft.
2. Network autonomously registers wireless subscriber devices.
3. Full inbound and outbound calling functionality.
4. Full inbound and outbound network signaling functionality.
5. New technologies (air interfaces) can be added at any-time to the outer network (on the aircraft and in the terrestrial network) to make both the Aircraft In-Cabin Network 3 and the Air-to-Ground Network 2 "future-proof".
6. True OPGA capability—wireless subscriber devices act and appear just as if they were connected to their home network for any common air interface served.
7. Only one bill to subscriber from their home network providing roaming agreements are in place (encourages active use).
8. Optional billing through credit card or prepaid services.
9. Full data capability (packet or circuit).
10. Transparent signaling.
11. Single air-to ground pipe conveys all information, traffic and signaling; this greatly simplifies handoffs in the Air-to-Ground Network domain.

Disadvantages—
1. Requires roaming agreements with "home" network host service providers.
2. Home networks could theoretically block access to their subscriber pool through negative listing in their Preferred Roaming List (PRL), but this network still supports credit card calling for even these subscriber pools.
3. More complex, more expensive to implement multiple in-cabin air interfaces and Terrestrial Networks.
4. The Data Concentrator 821 should be absolutely reliable in its aggregation/dis-aggregation functionality to include minimizing overall latency to not impair transparent feature set functionality.

The top-level technical description of the Full Feature, Any Customer architecture follows.

The wireless subscriber devices 801-804 are identical to those used on the cellular/PCS ground-based communication network 1. The system contemplates supporting any Common Air Interface, typically those which are most widely used—GSM, CDMA and iDEN, as well as Wi-Fi (802.11). The aircraft 103 is equipped with an in-cabin antenna system 805 which provides coverage for the wireless subscriber devices 801-804 located within the cabin. Multiple antennas may be utilized to provide coverage to wireless subscriber devices 801-804 throughout the cabin of some or all aircraft. The antenna system 805 is connected to the base station equipment 811-814 which typically consist of multiple base stations and/or access points, with each dedicated to a single common air interface and frequency band. Alternatively, the base station equipment 811-814 may serve multiple frequency bands for a given common air interface. The base stations 811-814 transmit and receive radio frequencies conforming to the appropriate industry standards for each common air interface implemented for service on the aircraft. Base stations 811-814 modulate and demodulate the transmit and receive signals respectively, and receive input signals and generate output signals for traffic (voice and/or data) and signaling channels in conformance with industry and/or commercial specifications. All signaling and traffic channels (SC denotes Signaling Channel; TC denotes Traffic Channel), regardless of transmission format, connect to the Data Concentrator 821.

Data Concentrator 821 and Air-to-Ground Radio Equipment 822 of this system serve to replace the previously described one-one paired channelization interface between the In Cabin Network 3 and air to Ground Network 2 having an aggregated wireless link to/from the aircraft. This equipment converts the individual traffic and signaling channels from the base stations to/from an aggregate data stream, and transmits/receives the aggregate data streams over the Air-to-Ground Network 2 which maintains continuous service as the aircraft travels. The Air-Ground Radio Equipment 822 includes radio transmission equipment and antenna systems to communicate with ground-based transceivers in the ground-based portion of the Air-to-Ground Network 2. The individual traffic channels assigned on the Air-to-Ground Network 2 are activated based upon the traffic demand to be supported from the aircraft. The Air-to-Ground Network 2 may utilize any suitable spectrum available for air-to-ground communications, including the NATS band. In an alternative, spectrum is utilized in the PCS or Cellular bands, with suitable interference coordination with any ground-based communication networks occupying the band used. A common air interface based upon CDMA2000 1xEVDO provides many suitable characteristics, including various data rates which may be applied to aircraft with varying traffic demands. In another alternative, a different common air interface such as GSM/GPRS/EDGE, or a specialized air interface can be utilized.

The Ground-Air Radio equipment 823, 824 supports communications from multiple aircraft within the service area of the ground station. Ground-Air Radio systems 823, 824 may employ a single omni-directional signal, or may employ multiple spatial sectors which may be defined in terms of azimuth and/or elevation angles. Aircraft communications hand over between Ground-Air Radio systems 823, 824 in different locations, in order to maintain continuity of service on Air-to-Ground Network 2. Handovers may be hard or soft, or may be a combination of hard and soft on the air-ground and ground-air links.

The Ground Station Controller 825 provides mobility management for all airborne systems and provides hand over management between ground stations as an airborne system moves between the service areas of adjoining ground stations. The Ground Station Controller 825 interfaces all traffic to/from the Ground-Air Radio equipment 823, 824 to the remainder of the Ground-Air Radio equipment 823, 824 and 826. The Data Router and Port Manager (DRPM) 826 aggregates all traffic to/from various Base Station Controllers and related equipment 831, 832, 833, 834, 835 and controls assignment of capacity of each of the Ground-Air Radio equipment 823, 824 amongst the airborne systems within their respective service areas. The Data Router and Port Manager (DRPM) 826 also converts the IP data traffic carried on the air to ground system into conventional circuits for the interfaces to the respective Base Station Controller subsystems 831-834 for each technology. These include base station controllers and packet data servers for GSM 831, CDMA 832 and iDEN 833, 834 and an Authentication, Authorization and Accounting (AAA) server 835 for Wi-Fi data traffic.

The Base Station Controllers 831-835 are in turn connected to conventional Voice and Data switching/routing systems 851-855 for each of the served air interface technologies. The Voice and Data switching/routing systems are connected in the conventional fashion to the public telephone and data networks. Connections are also provided to signaling systems networks which provide access to the home wireless systems of roaming airborne subscribers or to credit card and/or pre-subscription services for airborne subscribers that do no have home carriers with roaming agreements that support automatic roaming while airborne.

The "Full Feature, Any Customer" architecture realizes true bi-directional communications capability for both subscriber traffic as well as internal network signaling. The "Full Feature, Any Customer" topology is really a "network within a network" where the Air-to-Ground Network 2 is actually just a transport link to and from the aircraft. This "inner transport network" can be considered the "link layer" of a larger network or set of networks.

In the preferred embodiment, the Air-to-Ground Network 2 transports all traffic to/from the aircraft in a single, aggregated communication channel. This "single pipe" has distinct advantages in terms of managing hard and soft handoffs as the aircraft transitions between one ground-based cell to the next. This approach also takes advantage of newer, higher speed wireless cellular technologies.

The described preferred embodiment minimizes the use of custom hardware/software and takes advantage of cleverly architecting the arrangement of available building blocks in a new and novel manner. Depending on traffic volume, a given aircraft could have a multiplicity of aggregated channels and the channelization structure may be different for the forward and reverse paths. In general this architecture is capable of supporting virtually any wireless technology within the Aircraft In-Cabin Network environment.

Resident on board each aircraft are cellular base stations for each supported Aircraft In-Cabin Network air interface to include GSM, CDMA, iDen and others. These base stations generally behave, not in an isolated environment, but rather as remote extensions of the ground-based cellular communication network (to which the wireless subscriber devices are attached with a flexible "umbilical cord"). To complete this umbilical functionality, the hard wired signaling path from the base station, called "SC", conveys all the requisite signaling information that would normally be resident in any standard cellular network. From that point forward, the SC intrasystem communication is via standard means well known in the art. While each air interface's SC methodology has unique attributes, features and benefits, this is simply being re-used with minimal modification (see specific items such as DPC which require unique handling).

Note that, as seen in FIG. 8, the ground-based communication network 1 must have network elements for each Aircraft In-Cabin Network supported air interface (GSM to CDMA). In essence the inner network (or Air to Ground system) simply provides a common channel for the transmission of all signaling and traffic data that would normally pass between the Base Transceiver Stations and Base Station Controllers of several typical cellular networks which support differing common air interfaces.

Unique to the "Full Feature, Any Customer" approach, instead of using a channel-to-channel pairing between the Aircraft In-Cabin Network 3 and the Air-to-Ground Network 2, all customer traffic and all base station-to-BSC signaling is aggregated as one composite data stream in the preferred embodiment and conveyed across one wireless link via the Air-to-Ground Network 2. In a similar fashion, on the ground at a given cell site, the RF signal is demodulated to a digital data stream (this is the "inner network") and parsed accordingly by the "Data Router, Port Manager" and delivered to the correct BSC based upon IP addressing information provided by the data concentrator on the aircraft.

Integrating GSM Wireless Subscriber Devices with Iridium

Figure 10:
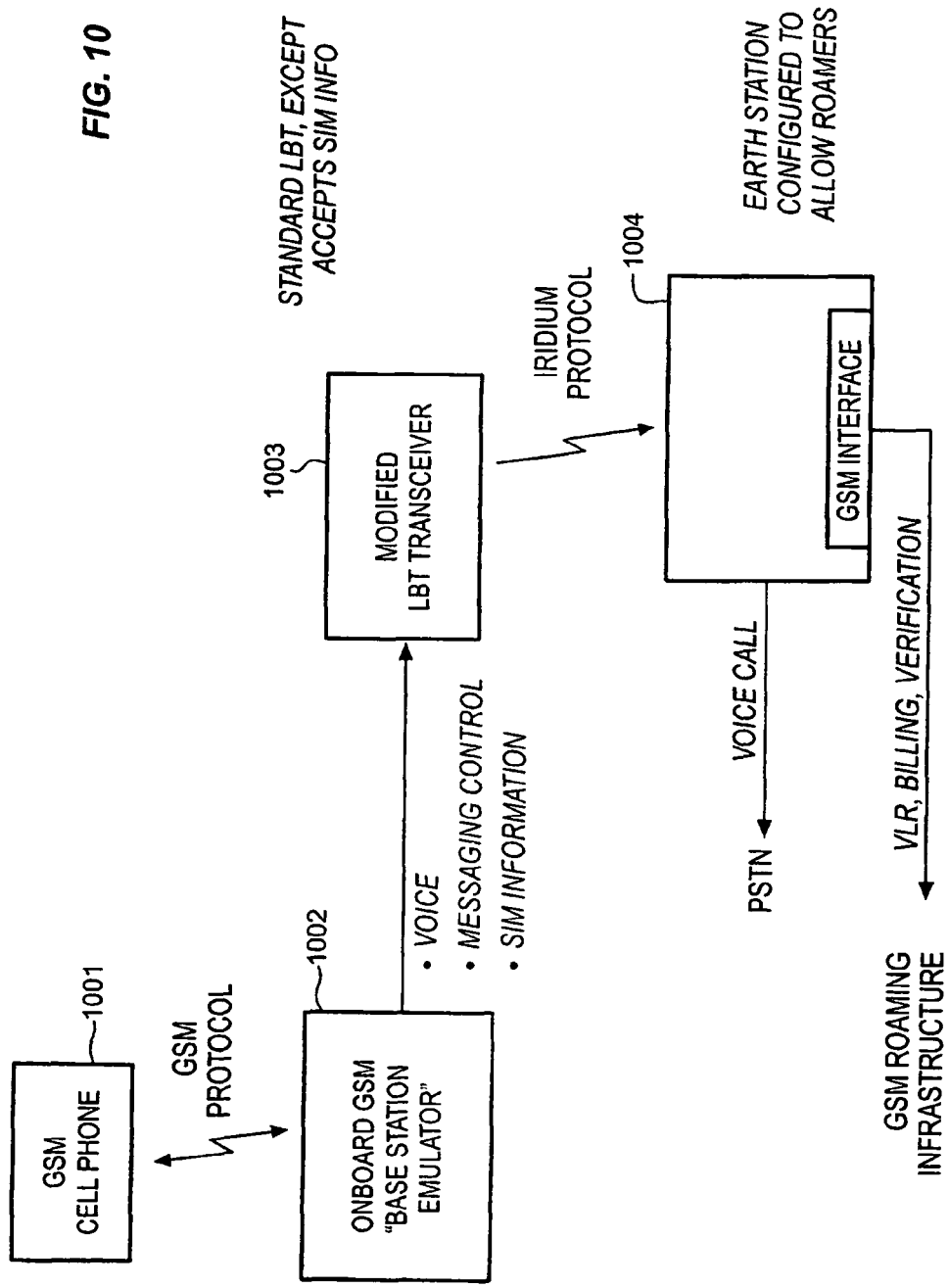
FIG. 10 illustrates, in block diagram form, the GSM Handset to Iridium Architecture.

FIG. 10 illustrates, in block diagram form, the GSM Handset to Iridium Architecture. Another satellite Air-to-Ground Network embodiment is the integration of a GSM wireless subscriber device 1001 operating within the Aircraft In-Cabin Network 3 with an Iridium (preferred embodiment) satellite link, or Air-to-Ground Network 2. This architecture uses a GSM wireless subscriber device 1001 while airborne connected to the Aircraft In-Cabin Network 3 having a GSM base station 1002. The Aircraft In-Cabin Network 3 is then connected to an Iridium Link 1003, 1004 which completes the Air-to-Ground Network 2 and delivers both subscriber traffic and GSM signaling to the ground-based cellular communication network. This architecture only supports outbound calling since there isn't a database that pairs up the GSM number with the Iridium number. Given that Iridium and GSM have similar signaling platforms, the call can be directly billed through the home cellular service provider's billing process.

Conceptually, the GSM handset "talks" to a local GSM cell site (the In Cabin Network), which strips off and captures the phone's SIM information. This SIM information is then sent to an Iridium transceiver, which uses that SIM information instead of its native "Iridium" SIM card. Since the underlying HLR architecture of the Iridium system is the same as a GSM system, the Iridium system recognizes the GSM handset, indirectly, as a roamer, and can then validate the user via normal roamer validation processes used in GSM. Similarly the ground-based cellular communication network can use the SIM information for billing, assuming the home provider of the GSM handset has a roaming agreement with Iridium.

Summary

The present Non-Terrestrial Feature Transparency System spoofs the air-to-ground network and the ground-based cellular communication network into thinking that the wireless subscriber devices have no special considerations associated with their operation, even though the wireless subscriber devices are located on an aircraft in flight. The Air-to-Ground Network transmits both the subscriber data (comprising voice and/or other data) as well as signaling and feature set data between the Aircraft in-Cabin Network and the ground-based cellular communication network to thereby enable the wireless subscriber devices that are located in the aircraft to receive consistent wireless communication services in both the terrestrial (ground-based) and non-terrestrial regions.

What is claimed:

1. A system for providing wireless data communication services to a plurality of wireless subscriber devices that are located in an aircraft, comprising:
    aircraft network, located in said aircraft, for generating radio frequency communication signals to communicate with a plurality of wireless subscriber devices that are located in said aircraft to exchange data between said plurality of wireless subscriber devices and said aircraft network;
    air-to-ground network for bi-directional radio frequency communications between said aircraft and a ground-based communications network having at least one ground-based base station located on the ground for interconnection with at least one packet data switching system; and
    aircraft interface for interconnecting said aircraft network and said air-to-ground network to establish bi-directional data communications sessions between said wireless subscriber devices and said ground-based communications network to interconnect said wireless subscriber devices with said packet data switching system by exchanging both subscriber data traffic and at least one of network signaling and administrative data on separate concurrently available logical channels, comprising:
        in-cabin call termination for providing a signaling termination for each call from a one of said wireless subscriber devices that are located in the aircraft to provide protocol management of signaling to both said ground-based communications network and said wireless subscriber devices, comprising:
            a first aircraft interface channel for providing a radio frequency interface to the wireless subscriber devices to provide a pseudo base station with transparent handset signaling to mimic the operation of the ground-based base station to the wireless subscriber devices; and
            a second aircraft interface channel for providing a radio frequency interface to the ground-based base transceiver to provide mirrored handset signaling to mimic the operation of the wireless subscriber devices to the ground-based base station.

2. The system for providing wireless communication services of claim 1 wherein said air-to-ground network comprises:
    transmitter for generating air-to-ground radio frequency signals for transmission to said at least one ground-based base station located on the ground;
    receiver for receiving ground-to-air radio frequency signals received from said at least one ground-based base station located on the ground; and
    antenna located on an external surface of said aircraft for exchanging said air-to-ground and ground-to-air radio frequency signals between said transmitter and said receiver and said at least one ground-based base station located on the ground.

3. The system for providing wireless communication services of claim 1 wherein said air-to-ground network comprises:
    transmitter for generating ground-to-air radio frequency signals for transmission to said aircraft;
    receiver for receiving air-to-ground radio frequency signals received from said aircraft; and
    antenna located on the ground for exchanging said air-to-ground and ground-to-air radio frequency signals between said aircraft and said at least one ground-based base station located on the ground.

4. The system for providing wireless communication services of claim 1 wherein said air-to-ground network comprises:
    ground station controller for providing mobility management and hand over management for subscriber traffic from said plurality of wireless subscriber devices.

5. The system for providing wireless communication services of claim 4 wherein said air-to-ground network further comprises:
    a plurality of mobile switching system interfaces for interconnecting said communications from at least one of said plurality of wireless subscriber devices with conventional Voice and Data switching systems.

6. The system for providing wireless communication services of claim 1 wherein said aircraft network comprises:
    aircraft cellular communication cell site for establishing at least one wireless LAN-based cell site to communicate via data-based communications with at least one of said plurality of wireless subscriber devices.

7. The system for providing wireless communication services of claim 6 wherein said aircraft interface comprises:
    data concentrator for converting a plurality of said data-based communications received from said plurality of wireless subscriber devices to an aggregate data stream.

8. The system for providing wireless communication services of claim 7 wherein said aircraft interface further comprises:
    a plurality of ground-based base stations for communicating with at least one of said plurality of wireless subscriber devices; and
    data router for disaggregating said aggregate data stream into a plurality of data streams and delivering each of said plurality of data streams to at least one of said plurality of ground-based base stations.

9. The system for providing wireless communication services of claim 1 wherein said aircraft interface comprises:
  radio frequency manager for managing at least one radio frequency attribute of said system for providing wireless communication services from the set of radio frequency attributes including: the in-cabin radio frequency environment which controls wireless subscriber device access to services; the EMI/RFI environment by commanding the wireless subscriber devices to the lowest necessary radio frequency power; and a radio frequency scheme for signaling and traffic which does not cause interference to operations in the ground-based communication network.

10. The system for providing wireless communication services of claim 1 wherein said in-cabin call termination comprises:
  spooling device for spooling the wireless subscriber devices by intelligently removing and replacing selected network signaling information in the protocol management.

11. The system for providing wireless communication services of claim 1 wherein said aircraft interface comprises:
  in-cabin call disabling manager for disabling operation of selected ones of said wireless subscriber devices that are located in the aircraft.

12. The system for providing wireless communication services of claim 1 wherein said aircraft interface comprises:
  channel manager for exchanging both subscriber traffic and at least one of network signaling and administrative data on separate concurrently available logical channels between said aircraft network means and said ground-based communications network.

13. The system for providing wireless communication services of claim 12 wherein said air-to-ground network comprises:
  data concentrator for converting the subscriber traffic and signaling channels received from said ground-based communications network to an aggregate data stream.

14. The system for providing wireless communication services of claim 13 wherein said aircraft interface comprises:
  data disaggregator for converting the aggregate data stream received from said air-to-ground network into subscriber traffic and signaling channels for said aircraft network.

15. The system for providing wireless communication services of claim 12 wherein said aircraft interface further comprises:
  call manager for maintaining call data, relating to said wireless subscriber devices that are generating a data stream comprising said subscriber traffic and signaling channels;
  wherein said air-to-ground network further comprises:
    a plurality of ground-based base stations for communicating with at least one of said plurality of wireless subscriber devices via said data stream; and
    handoff manager, responsive to initiation of a call handoff from a first one of said ground-based base stations to a second one of said ground-based base stations, for redirecting transmission of said data stream from said first ground-based base stations to said second ground-based base stations.

16. The system for providing wireless communication services of claim 15 wherein said aircraft interface further comprises:
  call management data handoff manager for forwarding said call data, relating to said wireless subscriber devices that are generating said subscriber traffic and signaling channels, to said second ground-based base stations.

17. The system for providing wireless communication services of claim 12 wherein said aircraft interface comprises:
  data concentrator for converting the individual traffic and signaling channels received from said plurality of wireless subscriber devices to an aggregate data stream.

18. The system for providing wireless communication services of claim 17 wherein said air-to-ground network further comprises:
  a plurality of ground-based base stations for communicating with at least one of said plurality of wireless subscriber devices; and
  data router for disaggregating said aggregate data stream into a plurality of data streams and delivering each of said plurality of data streams to at least one of said plurality of ground-based base stations.

19. The system for providing wireless communication services of claim 1 wherein said air-to-ground network further comprises:
  a plurality of mobile switching centers for interconnecting said communications from at least one of said plurality of wireless subscriber devices with conventional Voice and Data switching systems.

20. The method for providing wireless communication services of claim 19 wherein said step of communicating via an aircraft interface comprises:
  converting the individual traffic and signaling channels received from said plurality of wireless subscriber devices to an aggregate data stream.

21. The method for providing wireless communication services of claim 20 wherein said step of communicating via an air-to-ground network further comprises:
  communicating via a plurality of ground-based base stations with at least one of said plurality of wireless subscriber devices; and
  disaggregating said aggregate data stream into a plurality of data streams and delivering each of said plurality of data streams to at least one of said plurality of ground-based base stations.

22. The system for providing wireless communication services of claim 1 wherein said air-to-ground network comprises:
  transmitter for generating aircraft-to-satellite radio frequency signals for transmission to said at least one ground-based base station located on the ground via at least one satellite;
  receiver for receiving satellite-to-aircraft radio frequency signals received from said at least one satellite; and
  antenna located on an external surface of said aircraft for exchanging said aircraft-to-satellite and satellite-to-aircraft radio frequency signals between said transmitter and said receiver and said at least one satellite.

23. The system for providing wireless communication services of claim 1 wherein said aircraft interface comprises:
  authentication manager for verifying the identity of said plurality of wireless subscriber devices.

24. The system for providing wireless communication services of claim 23 wherein said aircraft interface comprises:
  authorization manager for determining a set of services that each of said plurality of wireless communication devices is authorized to receive.

25. A method for providing wireless data communication services to a plurality of wireless subscriber devices that are located in an aircraft, comprising:
  communicating, via an aircraft network located in said aircraft that generates radio frequency communication signals, with a plurality of said wireless subscriber devices that are located in said aircraft to exchange data between said plurality of wireless subscriber devices and said aircraft network;

communicating, via an air-to-ground network that generates radio frequency communications, between said aircraft and a ground-based communications network having at least one ground-based base station located on the ground for interconnection with at last one packet data switching system; and interconnecting said aircraft network and said air-to-ground network to establish bi-directional data communications sessions between said wireless subscriber devices and said ground-based communications network to interconnect said wireless subscriber devices with said packet data switching system by exchanging both subscriber data traffic and at least one of network signaling and administrative data on separate concurrently available logical channels, comprising:

providing a signaling termination for each call from a one of said wireless subscriber devices that are located in the aircraft to provide protocol management of signaling to both said ground-based communications network and said wireless subscriber devices, comprising:

providing a first aircraft interface channel to provide a radio frequency interface to the wireless subscriber devices to provide a pseudo base station with transparent handset signaling to mimic the operation of the ground-based base station to the wireless subscriber devices; and providing a second aircraft interface channel to provide a radio frequency interface to the ground-based base transceiver to provide mirrored handset signaling to mimic the operation of the wireless subscriber devices to the ground-based base station.

26. The method for providing wireless communication services of claim 25 wherein said step of communicating via an air-to-ground network comprises:

generating, in a transmitter, air-to-ground radio frequency signals for transmission to said at least one ground-based base station located on the ground;

receiving, in a receiver, ground-to-air radio frequency signals received from said at least one ground-based base station located on the ground; and exchanging via an antenna located on an external surface of said aircraft said air-to-ground and ground-to-air radio frequency signals between said transmitter and said receiver and said at least one ground-based base station located on the ground.

27. The method for providing wireless communication services of claim 25 wherein said step of communicating via an air-to-ground network comprises:

generating, in a transmitter, ground-to-air radio frequency signals for transmission to said aircraft;

receiving, in a receiver, air-to-ground radio frequency signals received from said aircraft; and exchanging via an antenna located on the ground said air-to-ground and ground-to-air radio frequency signals between said transmitter and said receiver and said aircraft.

28. The method for providing wireless communication services of claim 25 wherein said step of communicating via an air-to-ground network comprises:

operating a ground station controller to provide mobility management and hand over management for subscriber traffic from said plurality of wireless subscriber devices.

29. The method for providing wireless communication services of claim 28 wherein said step of communicating via an air-to-ground network further comprises:

interconnecting, via a plurality of mobile switching systems, said communications from at least one of said plurality of wireless subscriber devices with conventional Voice and Data switching systems.

30. The method for providing wireless communication services of claim 25 wherein said step of communicating via an aircraft network comprises:

establishing at least one wireless LAN-based cell site to communicate via data-based communications with at least one of said plurality of wireless subscriber devices.

31. The method for providing wireless communication services of claim 30 wherein said step of communicating via an aircraft interface comprises:

converting a plurality of said data-based communications received from said plurality of wireless subscriber devices to an aggregate data stream.

32. The method for providing wireless communication services of claim 31 wherein said step of communicating via an air-to-ground network further comprises:

communicating via a plurality of ground-based base stations with at least one of said plurality of wireless subscriber devices; and disaggregating said aggregate data stream into a plurality of data streams and delivering each of said plurality of data streams to at least one of said plurality of ground-based base stations.

33. The method for providing wireless communication services of claim 32 wherein said step of communicating via an aircraft interface comprises:

converting the aggregate data stream received from said air-to-ground network into subscriber traffic and signaling channels for said aircraft network.

34. The method for providing wireless communication services of claim 25 wherein said step of communicating via an aircraft interface comprises:

managing at least one radio frequency attribute of said system for providing wireless communication services from the set of radio frequency attributes including: the in-cabin radio frequency environment which controls wireless subscriber device access to services; the EMI/RFI environment by commanding the wireless subscriber devices to the lowest necessary radio frequency power; and a radio frequency scheme for signaling and traffic which does not cause interference to operations in the ground-based communication network.

35. The method for providing wireless communication services of claim 25 wherein said step of providing a first radio frequency interface comprises:

spoofing the wireless subscriber devices by intelligently removing and replacing selected network signaling information in the protocol management.

36. The method for providing wireless communication services of claim 25 wherein said step of communicating via an aircraft interface comprises:

disabling operation of selected ones of said wireless subscriber devices that are located in the aircraft.

37. The method for providing wireless communication services of claim 25 wherein said step of communicating via an aircraft network comprises:

exchanging both subscriber traffic and at least one of network signaling and administrative data on separate concurrently available logical channels between said aircraft network and said ground-based communications network.

38. The method for providing wireless communication services of claim 37 wherein said step of communicating via an air-to-ground network comprises:
converting the subscriber traffic and signaling channels received from said ground-based communications network to an aggregate data stream.

39. The method for providing wireless communication services of claim 37 wherein said step of communicating via an aircraft interface further comprises:
maintaining call data, relating to said wireless subscriber devices that are generating a data stream comprising said subscriber traffic and signaling channels;
wherein said step of communicating via an air-to-ground network further comprises:
communicating, via a plurality of ground-based base stations, with at least one of said plurality of wireless subscriber devices via said data stream; and
redirecting, in response to initiation of a call handoff from a first one of said ground-based base stations to a second one of said ground-based base stations, transmission of said data stream from said first ground-based base station to said second ground-based base station.

40. The method for providing wireless communication services of claim 39 wherein said step of communicating via an aircraft interface further comprises:
forwarding said call data, relating to said wireless subscriber devices that are generating said subscriber traffic and signaling channels, to said second ground-based base station.

41. The method for providing wireless communication services of claim 37 wherein said step of communicating via an air-to-ground network comprises:
generating, in a transmitter, aircraft-to-satellite radio frequency signals for transmission to said at least one transceiver located on the ground via at least one satellite;
receiving, in a receiver, satellite-to-aircraft radio frequency signals received from said at least one satellite; and
exchanging, via an antenna located on an external surface of said aircraft, said aircraft-to-satellite and satellite-to-aircraft radio frequency signals between said transmitter and said receiver and said at least one satellite.

42. The method for providing wireless communication services of claim 25 wherein said step of communicating via an air-to-ground network further comprises:
interconnecting, via a plurality of mobile switching centers, said communications from at least one of said plurality of wireless subscriber devices with conventional Voice and Data switching systems.

43. The method for providing wireless communication services of claim 25 wherein said step of interconnecting comprises:
verifying the identity of said plurality of wireless subscriber devices.

44. The method for providing wireless communication services of claim 43 wherein said step of interconnecting further comprises:
determining a set of services that each of said plurality of wireless communication devices is authorized to receive.

* * * * *